United States Patent
Katoh

(10) Patent No.: US 9,531,891 B2
(45) Date of Patent: Dec. 27, 2016

(54) PRINTER IDENTIFICATION AND SETTING CONTROL PROGRAM AND INFORMATION PROCESSING APPARATUS IMPLEMENTING THE PRINTER IDENTIFICATION AND SETTING CONTROL PROGRAM

(71) Applicant: Yuhei Katoh, Kanagawa (JP)

(72) Inventor: Yuhei Katoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/876,965

(22) Filed: Oct. 7, 2015

(65) Prior Publication Data
US 2016/0105570 A1 Apr. 14, 2016

(30) Foreign Application Priority Data

Oct. 14, 2014 (JP) .................. 2014-209827
Jul. 17, 2015 (JP) .................. 2015-142605

(51) Int. Cl.
*H04N 1/00* (2006.01)
*G06F 3/12* (2006.01)

(52) U.S. Cl.
CPC .......... *H04N 1/00244* (2013.01); *G06F 3/122* (2013.01); *G06F 3/1225* (2013.01); *G06F 3/1285* (2013.01); *H04N 1/00204* (2013.01); *H04N 2201/0094* (2013.01)

(58) Field of Classification Search
CPC ................................ H04N 1/00244
USPC ........................................ 358/1.15
See application file for complete search history.

(56) References Cited

U.S. PATENT DOCUMENTS

| 8,477,325 B2 | 7/2013 | Fukasawa | |
| 2006/0279776 A1* | 12/2006 | Akiyama | G06F 3/1204 358/1.15 |
| 2012/0327460 A1 | 12/2012 | Katoh | |
| 2013/0242334 A1* | 9/2013 | Ichida | G06F 3/1222 358/1.14 |
| 2014/0233050 A1* | 8/2014 | Kishida | G06F 3/1225 358/1.13 |

FOREIGN PATENT DOCUMENTS

JP 2010-205009 9/2010

* cited by examiner

*Primary Examiner* — Jacky X Zheng
(74) *Attorney, Agent, or Firm* — IPUSA, PLLC

(57) ABSTRACT

An information processing apparatus includes a generation unit configured to generate identification information unique to each logical printer, a storage unit configured to store setting information of a logical printer in association with identification information unique to the logical printer and name information of the logical printer in a storage area that is managed with respect to each user by an operating system, and a deletion unit configured to delete unnecessary information that is stored in the storage area based on the identification information unique to the logical printer and the name information of the logical printer.

13 Claims, 20 Drawing Sheets

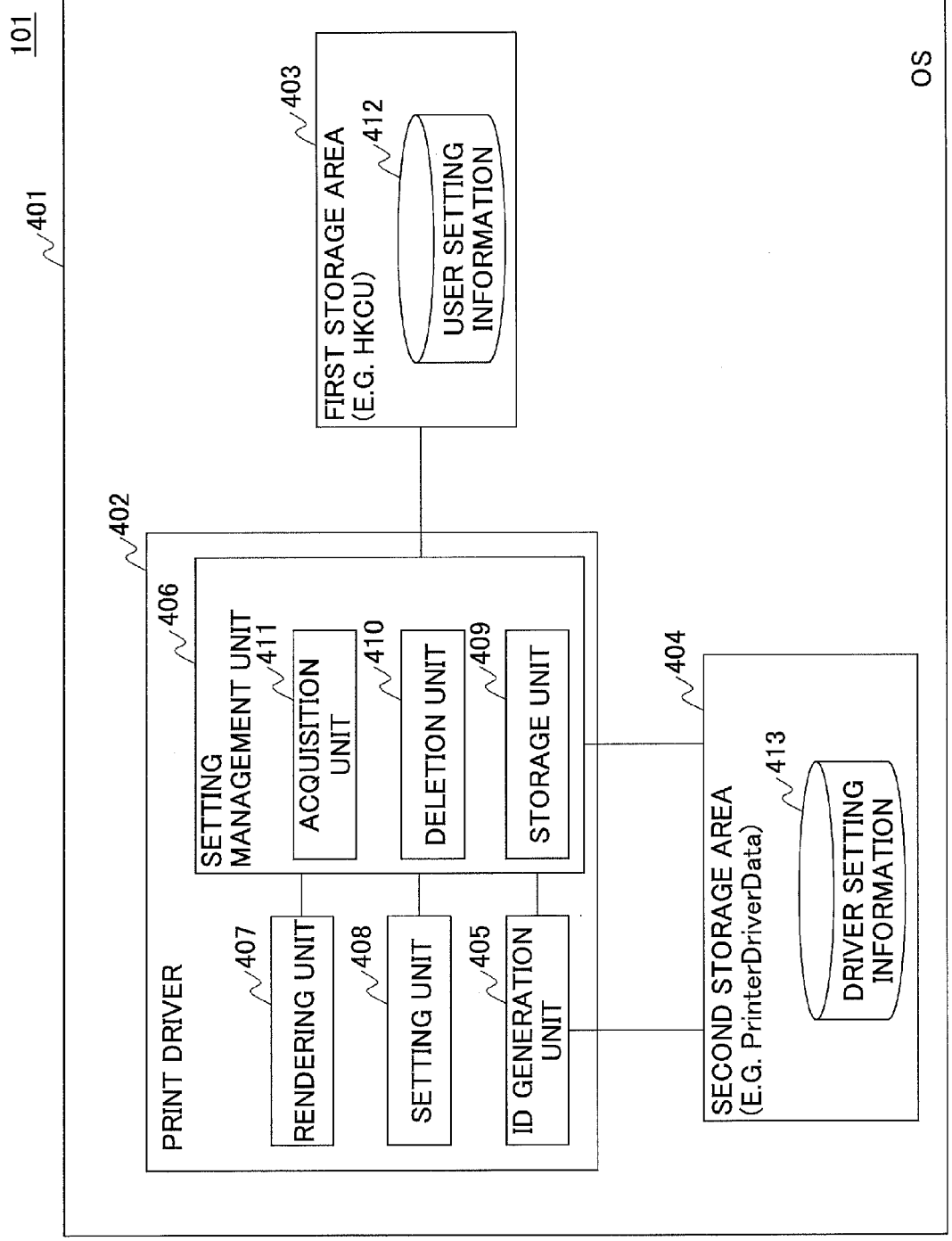

- SAMPLE Driver 1 — 501
  - DsDriver
  - DsSpooler
  - PnPData
  - PrinterDriverData — 502

502

| NAME (KEY) | TYPE | DATA |
|---|---|---|
| . . | . . | . . |
| LOGICAL PRINTER ID | REG_SZ | PRID00001 |
| . . | . . | . . |

FIG.6

| NAME (KEY) | TYPE | DATA |
|---|---|---|
| . . | . . | . . |
| Printer_icon_code::SAMPLE Driver 1 | REG_SZ | PRID00001 |
| PRID00001 | REG_BINARY | 06 58 3F 38 60 1B ... |
| . . | . . | . . |

412

601
602
603

- SAMPLE Driver 1 — 701
  - PRID00001 — 702
    - gui

702

| NAME (KEY) | TYPE | DATA |
|---|---|---|
| . . | . . | . . |
| Printer_icon_code::SAMPLE Driver 1 | REG_SZ | PRID00001 |
| . . | . . | . . |

FIG.17A

| NAME (KEY) | TYPE | DATA |
|---|---|---|
| Printer_icon_code::SAMPLE Driver 1 | REG_SZ | PRID00001 |
| PRID00001 | REG_BINARY | 06 58 3F 38 60 1B .... |

| NAME (KEY) | TYPE | DATA |
|---|---|---|
| Printer_icon_code::SAMPLE Driver 1 | REG_SZ | PRID00001 |
| PRID00001 | REG_BINARY | 06 58 3F 38 60 1B .... |
| PRID00102 | REG_BINARY | 06 58 3F 38 60 1B .... |

| NAME (KEY) | TYPE | DATA |
|---|---|---|
| Printer_icon_code::SAMPLE Driver 1 | REG_SZ | PRID00102 |
| PRID00102 | REG_BINARY | 06 58 3F 38 60 1B .... |

~1703

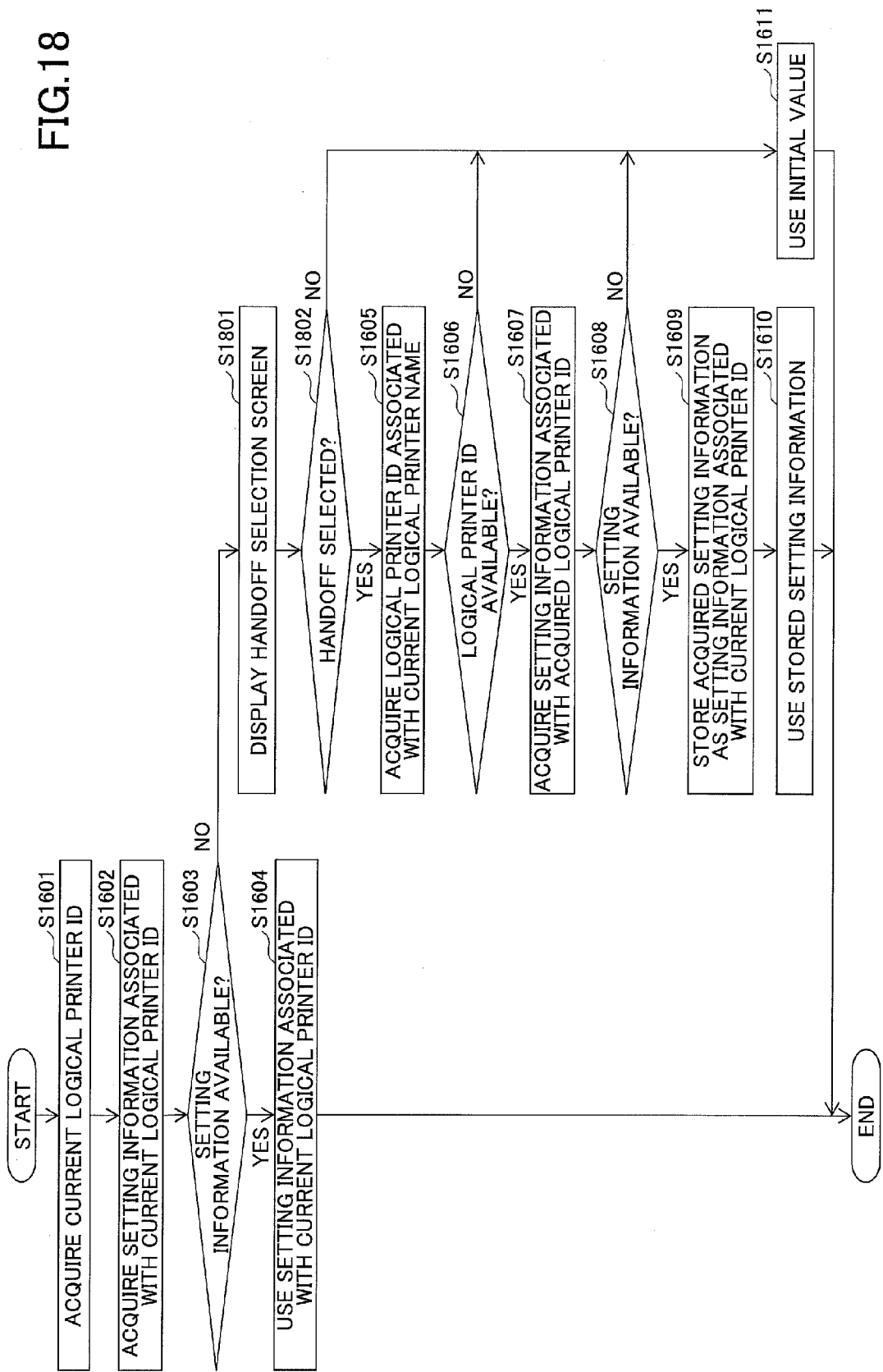

PRINTER IDENTIFICATION AND SETTING CONTROL PROGRAM AND INFORMATION PROCESSING APPARATUS IMPLEMENTING THE PRINTER IDENTIFICATION AND SETTING CONTROL PROGRAM

BACKGROUND OF THE INVENTION

1. Field of the Invention

The present invention relates to a print control program and an information processing apparatus.

2. Description of the Related Art

Printer drivers are known that control printing on an operating system (OS) and are capable of storing print settings in an area called the Devmode structure that is provided by the OS, for example. Also, printer drivers are known that are capable of storing settings for each logical printer as printer driver data in a storage area (e.g. registry) that is managed by the OS, for example.

Also, Japanese Laid-Open Patent Publication No. 2010-205009 (Patent Document 1) discloses a technique that involves generating a directory having a name represented by a unique character string for each logical printer, storing the unique character string in a registry managed by the OS, and storing setting information for each user of each logical printer in the generated directory.

In conventional techniques, when a logical printer is uninstalled (deleted) or the name of a logical printer is changed, for example, setting information associated with the logical printer may remain undeleted. On the other hand, according to the technique disclosed in Patent Document 1, setting information associated with a logical printer is stored in a directory having a unique character string corresponding to the logical printer. In this way, when deleting a logical printer, setting information associated with the logical printer may be easily deleted by deleting the directory having the unique character string corresponding to the logical printer.

However, according to the technique disclosed in Patent Document 1, the printer driver manages a directory that is distinct from a setting information storage area provided by the OS, and as such, setting information management functions provided by the OS such as sharing setting information among terminals and transferring setting information have been difficult to implement.

SUMMARY OF THE INVENTION

An aspect of the present invention is directed to providing a print control program that can readily use setting information management functions provided by an OS while suppressing an increase in unnecessary information resulting from the deletion of a logical printer or a change in the name of a logical printer, for example.

According to one embodiment of the present invention, an information processing apparatus includes a generation unit configured to generate identification information unique to each logical printer, a storage unit configured to store setting information of a logical printer in association with identification information unique to the logical printer and name information of the logical printer in a storage area that is managed with respect to each user by an operating system, and a deletion unit configured to delete unnecessary information that is stored in the storage area based on the identification information unique to the logical printer and the name information of the logical printer.

BRIEF DESCRIPTION OF THE DRAWINGS

FIG. 4 is a block diagram illustrating an exemplary functional configuration of the information processing apparatus according to a first embodiment of the present invention;

FIG. 6 is a table illustrating an exemplary configuration of setting information for each user according to the first embodiment;

FIGS. 17A-17C illustrate exemplary changes in the setting information according to the fourth embodiment;

FIG. 18 is a flowchart illustrating another exemplary setting information acquisition process according to the fourth embodiment;

DESCRIPTION OF THE PREFERRED EMBODIMENTS

In the following, embodiments of the present invention are described with reference to the accompanying drawings.

<System Configuration>

Figure 1:
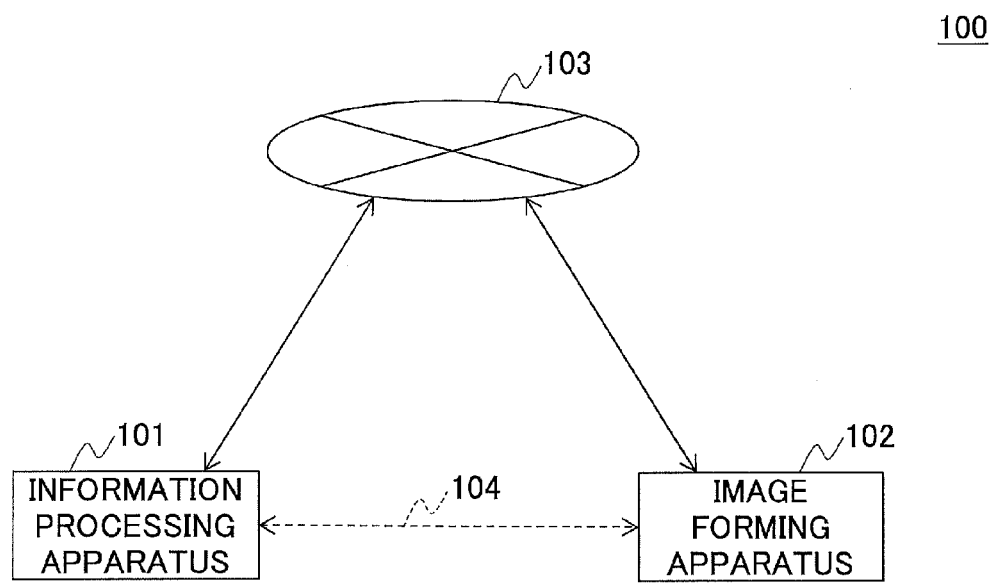
FIG. 1 is a diagram illustrating an exemplary configuration of an information processing system according to an embodiment of the present invention.

FIG. 1 illustrates an exemplary configuration of an information processing system 100 according to an embodiment of the present invention. The information processing system 100 includes an information processing apparatus 101 such as a PC (Personal Computer) and an image forming apparatus 102 that implements functions such as printing under the control of the information processing apparatus 101.

The information processing apparatus 101 and the image forming apparatus 102 may be connected to a network 103 such as the Internet or a LAN (Local Area Network) such that they may exchange data with each other, for example. Alternatively, the information processing apparatus 101 and the image forming apparatus 102 may be configured to exchange data with each other via an external interface 104 such as a serial interface, a parallel interface, a USB (Universal Serial Bus), or an IEEE 1394 interface, for example.

The image forming apparatus 102 is an electronic device having a print function. The image forming apparatus 102 may be a printer or a multifunction peripheral (MFP) having multiple functions such as printing, copying, scanning, and facsimile functions, for example.

The information processing apparatus 101 is at least capable of using the print function of the image processing apparatus 102 via the network 103 or the external interface 104.

<Hardware Configuration>

(Hardware Configuration of Information Processing Apparatus)

Figure 2:
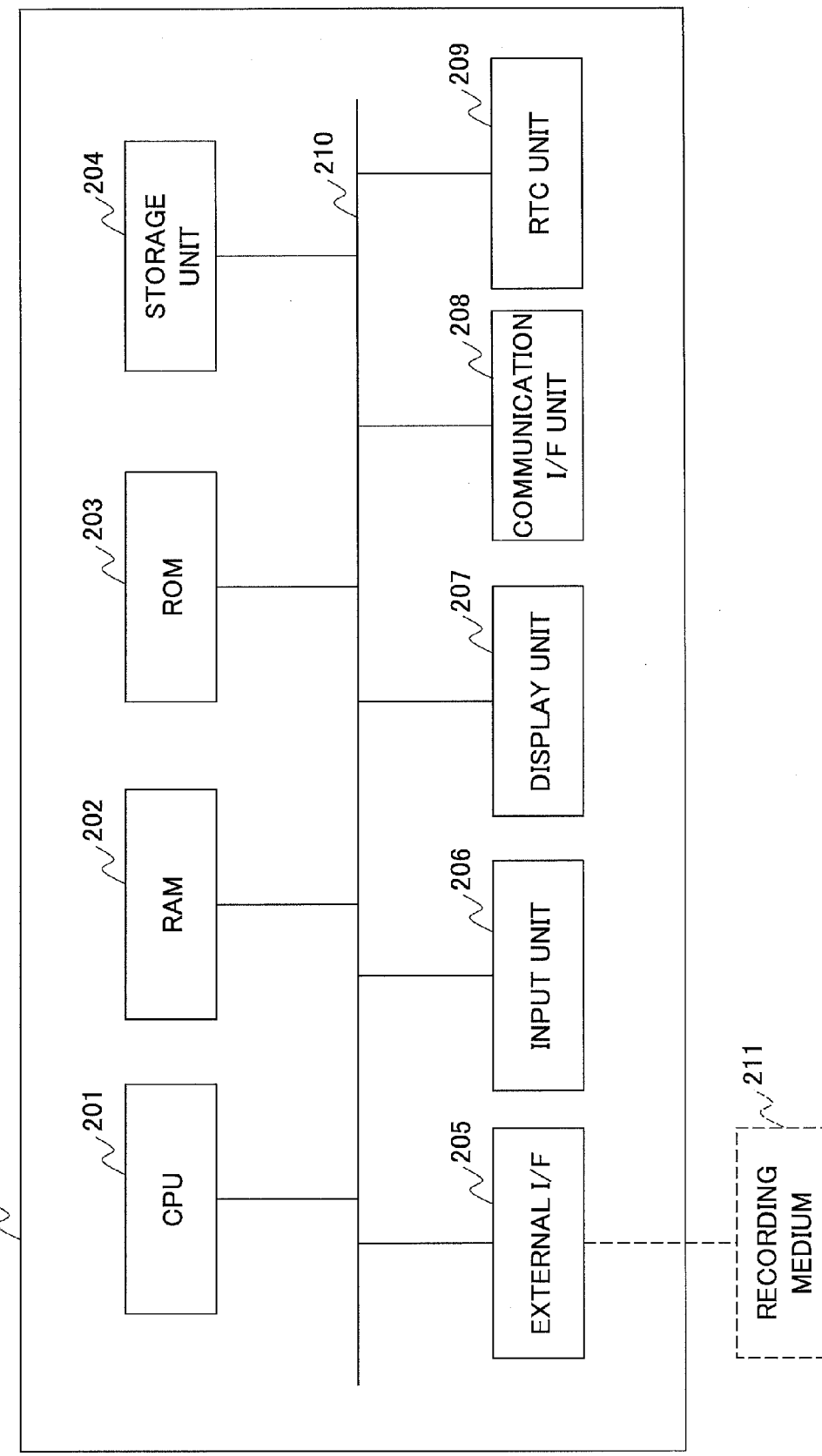
FIG. 2 is a block diagram illustrating an exemplary hardware configuration of an information processing apparatus according to an embodiment of the present invention.

FIG. 2 is a block diagram illustrating an exemplary hardware configuration of the information processing apparatus 101 according to an embodiment of the present invention. In FIG. 2, the information processing apparatus 101 has a hardware configuration of a general computer and includes a CPU (Central Processing Unit) 201, a RAM (Random Access Memory) 202, a ROM (Read Only Memory) 203, a storage unit 204, an external I/F (Interface) unit 205, an input unit 206, a display unit 207, a communication I/F unit 208, a RTC (Real Time Clock) unit 209, and a bus 210.

The CPU 201 includes a computing unit that reads a program and/or data stored in the ROM 203 or the storage unit 204, for example, loads the program and/or data on the RAM 202, and executes a process according to the program and/or data to implement various functions of the information processing apparatus 101. The RAM 202 is a volatile memory used as a working area for the CPU 201. The ROM 203 is a nonvolatile memory that holds programs and data even when the power is turned off, for example. The ROM 203 may be a flash ROM, for example.

The storage unit 204 is a storage device such as a HDD (Hard Disk Drive) or a SSD (Solid State Drive), for example, and is configured to store an OS (Operation System), various types of application programs and drivers including a printer driver, and various types of data.

The external I/F 205 is an interface with an external device. The external device may include the image forming apparatus 102 of FIG. 1 as well as a recording medium such as a USB memory, a memory card, or an optical disc, for example. The input unit 206 may include a pointing device such as a mouse and/or a keyboard to be used for inputting operation signals to the information processing apparatus 101. The display unit 207 may include a display such as LCD (Liquid Crystal Display), for example, and is configured to display processing results of the information processing apparatus 101.

The communication I/F 208 is an interface for connecting the information processing apparatus 101 to the network 103. For example, the information processing apparatus 101 may exchange data with the image forming apparatus 102 or another information processing apparatus via the communication I/F 208.

The RTC 209 has a clock function, and is configured to output information such as the date, time, and the like. The bus 210 is connected to the above components of the information processing apparatus 101 and is configured to transmit address signals, data signals, and various control signals, for example.

Note that the hardware configuration of FIG. 2 is merely an illustrative example. In other examples, the information processing apparatus 101 may have the input unit 206 and the display unit 207 as external units, or the input unit 206 and the display unit 207 may be integrated into a touch panel display.

(Hardware Configuration of Image Forming Apparatus)

Figure 3:
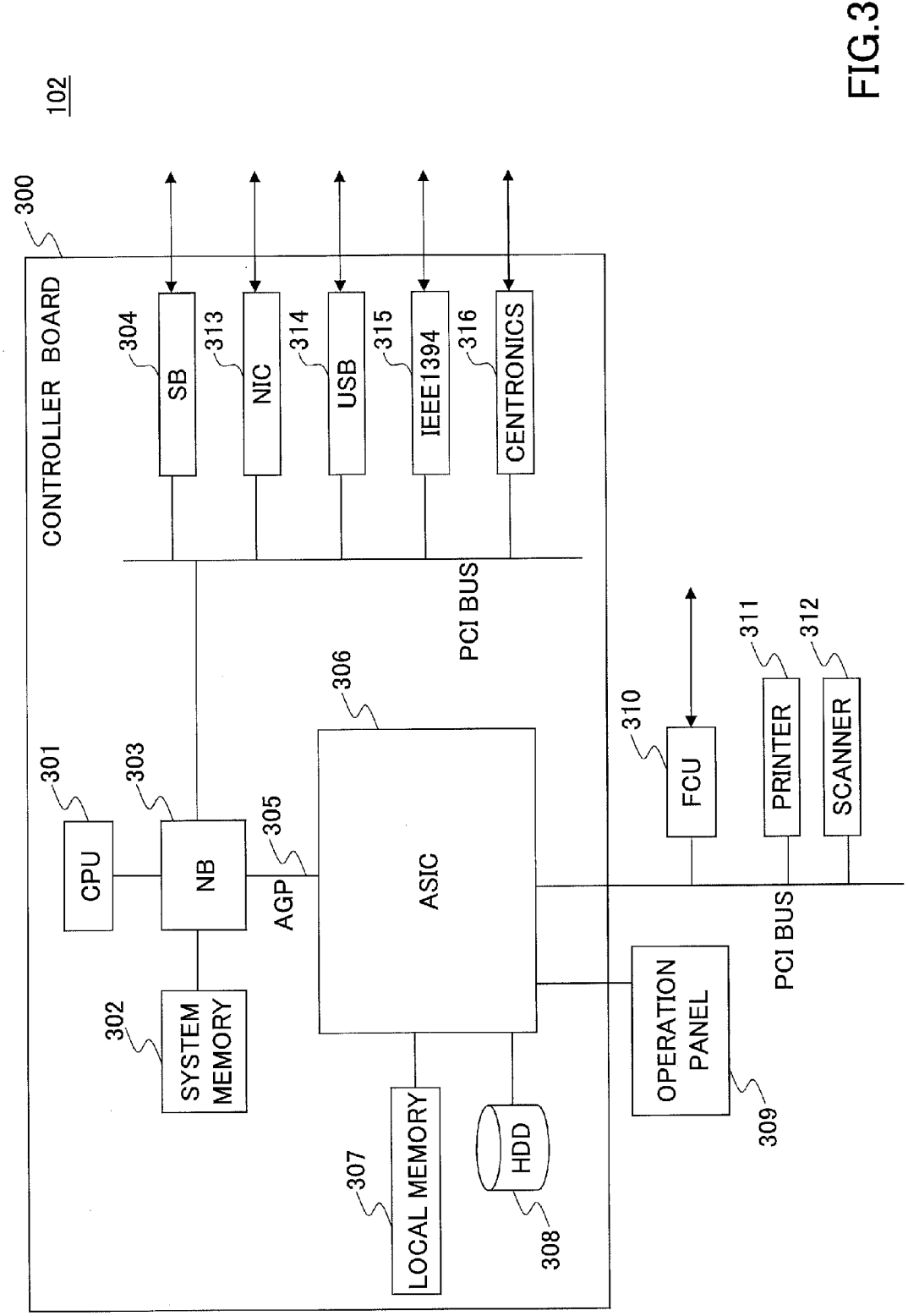
FIG. 3 is a block diagram illustrating an exemplary hardware configuration of an image forming apparatus according to an embodiment of the present invention.

FIG. 3 is a block diagram illustrating an exemplary hardware configuration of the image forming apparatus 102 according to an embodiment of the present invention. In FIG. 3, the image forming apparatus 102 corresponds to a multifunction peripheral (MFP) having a plurality of functions including printing, scanning, copying, and facsimile functions, for example.

The image forming apparatus 102 includes a controller board 300, an operation panel 309, and hardware engines such as a FCU (Facsimile Control Unit) 310, a printer 311, and a scanner 312.

The controller board 300 includes a CPU 301, a system memory 302, a NB (North Bridge) 303, a SB (South Bridge) 304, an ASIC (Application Specific Integrated Circuit) 306, a local memory 307, a HDD (Hard Disk Drive) 308, a NIC (Network Interface Card) 313, a USB (Universal Serial Bus) interface 314, an IEEE 1394 interface 315, and a Centronics (IEEE 1284) interface 316.

The operation panel 309 is connected to the ASIC 306 of the controller board 300. The SB 304, the NIC 313, the USB interface 314, the IEEE 1394 interface 315, and the Centronics interface 316 are connected to the NB 303 via a PCI bus. The FCU 310, the printer 311, and the scanner 312 are connected to the ASIC 306 of the controller board 300 via the PCI bus.

In the controller board 300, the local memory 307 and the HDD 308 are connected to the ASIC 306, and the CPU 301 is connected to the ASIC 306 via the NB 303 of a CPU chip set. Also, the ASIC 306 and the NB 303 are interconnected via the AGP (Accelerated Graphics Port) 305 rather than via the PCI bus in order to increase processing speed, for example.

The CPU 301 is a processor that controls overall operations of the image forming apparatus 102. The CPU 301 implements various functions of the image forming apparatus 102 by running an OS and application programs that are stored in the HDD 308 to perform various services, for example.

The NB 303 is a bridge for interconnecting the CPU 301, the system memory 302, the SB 304, and the ASIC 306. The system memory 302 may include a ROM for storing programs and data, and a RAM to be used as a memory for loading programs and data and enabling rendering operations by the image forming apparatus 102, for example.

The SB 304 is a bridge for connecting the NB 303 and the PCI bus to peripheral devices. The local memory 307 is a memory that may be used as a copying image buffer, a code buffer, and the like. Note that in the following descriptions, the system memory 302 and the local memory 307 may simply be referred to as a "memory" or a "storage area".

The ASIC 306 is an integrated circuit for image processing applications that includes a hardware element for image processing. The HDD 308 is a storage device for storing images, programs, font data, form data, and the like.

The operation panel 309 corresponds to hardware for accepting input operations from a user (operation unit) as well as hardware for displaying information to the user (display unit). The FCU 310 transmits and receives FAX data in accordance with a standard such as G3 FAX (Group 3 Facsimile), for example. The printer 311 is a hardware engine that performs printing in accordance with a control program that is executed by the CPU 301, for example. The scanner 312 is a hardware engine that scans an image in accordance with a control program that is executed by the CPU 301, for example.

The NIC 313 is a communication interface for connecting the image forming apparatus 102 to the network 103 to enable the image forming apparatus 102 to transmit and receive data. The USB interface 314 is a serial bus interface for establishing connection with a recording medium such as a USB memory or various USB devices, for example. The IEEE 1394 interface 315 is an interface for establishing connection with devices conforming to the IEEE 1394 high-speed serial bus standard. The Centronics interface 316 is an interface for establishing connection with devices conforming to the Centronics (IEEE 1284) standard, which is a parallel port standard.

For example, the image forming apparatus 102 according to the present embodiment may have a general computer configuration as described above to implement various functions through the execution of relevant programs by the CPU 301.

First Embodiment

Functional Configuration

FIG. 4 is a block diagram illustrating an exemplary functional configuration of the information processing apparatus 101 according to a first embodiment of the present invention. In FIG. 4, the information processing apparatus 101 includes a printer driver 402, a first storage area 403, and a second storage area 404 that are run on an OS 401 such as Windows (registered trademark). In the following descriptions, it is assumed that the OS 401 is a Windows operating system; however, the present invention is equally applicable to other operating system environments.

The printer driver 402 is a program for controlling print operations performed by the image forming apparatus 102. The printer driver 402 includes a setting management unit 406, a rendering unit 407, a setting unit 408, and an ID (identification) generation unit 405.

The setting management unit 406 stores and manages setting information associated with the printer driver 402. The setting management unit 406 stores user setting information 412 corresponding to setting information with respect to each user in the first storage area 403 corresponding to a storage area managed with respect to each user by the OS 401.

Note that in the present descriptions, a logical printer refers to a virtual printer that may be represented by a printer icon displayed at a printer folder of the OS 401, for example. In the OS 401, a plurality of logical printers with different setting information (e.g. paper size, paper orientation, printing quality) may be created for one image forming apparatus 102. For example, a user may create a plurality of logical printers with different setting information such that the user would not have to designate settings each time the user performs a printing operation. That is, the user may perform printing operations for various purposes by selecting a logical printer corresponding to a desired setting.

Note that a printer icon displayed at a printer folder of the OS 401 is merely one example of a logical printer. In other examples, the logical printer may be managed at a location other than the printer folder of the OS 401, or the logical printer may be represented and displayed in a form other than a printer icon.

The rendering unit 407 converts print data from an application program into data printable by the image forming apparatus 102 such as PDL (Page Description Language) data, for example.

The setting unit 408 is a user interface for designating settings upon performing a printing operation using the image forming apparatus 102. For example, a user may select a logical printer, create a logical printer, or change the settings of a logical printer using the setting unit 408.

The ID generation unit 405 may generate identification information unique to each logical printer at the time the logical printer is created, for example.

The first storage area 403 is a storage area managed by the OS 401 with respect to each user. The first storage area 403 stores setting information of each user as the user setting information 412. In the case where the OS 401 is a Windows operating system, the first storage area 403 may correspond to a storage area such as the HKCU (HKEY_CURRENT_USERS) in a registry where setting information of a user currently logged into the OS 401 is stored, for example. Note that the user setting information 412 includes not only the setting information of a logical printer but also setting information of other applications.

The second storage area 404 is a storage area managed by the OS 401 with respect to each logical printer provided by the OS 401. The second storage area 404 stores setting information of each logical printer as driver setting information 413. In the case where the OS 401 is a Windows operating system, the second storage area 404 may correspond to a storage area such as the "PrinterDriverData" in the registry, for example. In the present embodiment, the unique identification information for each logical printer that is generated by the ID generation unit 405 is stored in the driver setting information 413 of the second storage area 404, and such identification information may be referenced via the setting management unit 406.

Figures 5A, 5B:
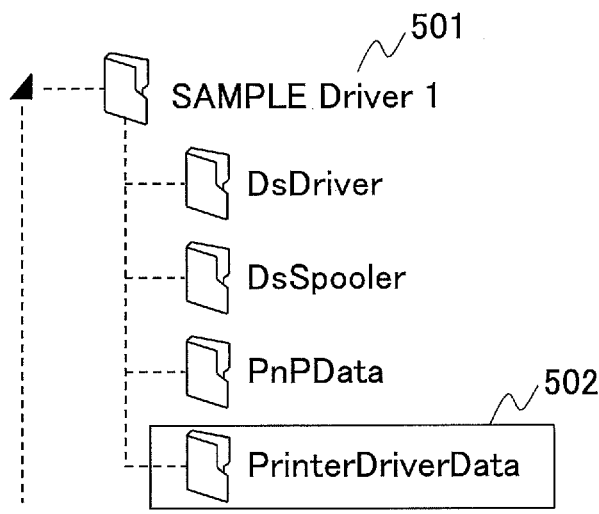
FIGS. 5A and 5B are diagrams illustrating an exemplary configuration of printer driver data according to the first embodiment.

FIGS. 5A and 5B illustrate an exemplary configuration of printer driver data according to the first embodiment. FIG. 5A illustrates a portion of a hierarchical structure of the Registry of the OS 401. In the example of FIG. 5A, "SAMPLE Driver 1" 501 corresponds to a logical printer name of a logical printer. Also, "PrinterDriverData" 502 corresponds to the second storage area 404 that stores the setting information of each logical printer.

As illustrated in FIG. 5B, the "PrinterDriverData" 502 may store identification information unique to the logical printer "PRID00001" that has been generated by the ID generation unit 405 in association with the name (key) "logical printer ID", for example. Note that the type "REG_SZ" stored in association with the logical printer ID indicates that the type of data used to represent the logical printer ID is a character string. Note, however, that the type of data representing the logical printer ID does not necessarily have to be a character string. By storing the logical printer ID of the logical printer, even when the name of the logical printer is changed, for example, the printer driver 402 may be able to unambiguously identify the logical printer by referring to its logical printer ID.

Referring back to FIG. 4, the setting management unit 406 is described in greater detail below. The setting management unit 406 includes a storage unit 409, a deletion unit 410, and an acquisition unit 411.

The storage unit 409 stores setting information of a logical printer in association with identification information unique to the logical printer (e.g. logical printer ID) and name information of the logical printer (e.g. a logical printer name) in the first storage area 403 as the user setting information 412.

The deletion unit 410 deletes unnecessary information from the user setting information 412 stored in the first storage area 403 based on the identification information unique to the logical printer and the name information of the logical printer.

For example, the logical printer ID as described above is a unique value assigned to each logical printer, and as such, no two logical printers can have the same value as their logical printer IDs. Accordingly, when the storage unit 409 stores setting information of a logical printer, the storage unit 409 may determine that setting information that is stored in association with the corresponding logical printer ID of the logical printer and a logical printer name other than the corresponding logical printer name of the logical printer is unnecessary information. Such unnecessary information may be detected when setting information of the logical printer is being stored for the first time after the logical printer name of the logical printer has been changed, for example.

Also, when the storage unit 409 stores setting information of a logical printer, the storage unit 409 may determine that setting information stored in association with the corresponding logical printer name of the logical printer and a logical printer ID other than the corresponding logical printer ID of the logical printer is unnecessary information. Such unnecessary information may be detected in a case where a logical printer has been deleted and a new logical printer with the same logical printer name as that of the deleted logical printer is created thereafter, or a case where the logical printer name of a logical printer has been changed to a previously existing logical printer name, for example.

The deletion unit 410 deletes such unnecessary information from the user setting information 412 stored in the first storage area 403.

The acquisition unit 411 acquires setting information of a logical printer that is stored in association with the logical printer ID of the logical printer from the user setting information 412 of the first storage area 403.

In the following, the user setting information 412 is described in greater detail.

FIG. 6 is a block diagram illustrating an exemplary configuration of user setting information according to the first embodiment. In the example of FIG. 6, the first storage area 403 stores a logical printer ID "PRID00001" 602 of a logical printer in association with the key "Printer_icon_code::SAMPLE Driver 1" 601 representing a logical printer name of the logical printer. Note that the portion "SAMPLE Driver 1" of the key "Printer_icon_code::SAMPLE Driver 1" 601 corresponds to the logical printer name of the logical printer.

Also, in the example of FIG. 6, setting information "06 58 3F 38 60 . . . " 603 of the logical printer is stored in association with the logical printer ID "PRID00001" 602. In this way, the setting management unit 406 may be able to unambiguously identify the setting information 603 of a logical printer based on the logical printer name 601 and the logical printer ID 602 of the logical printer. Note that the type "REG_BINARY" indicates that the type of data representing the setting information 603 is binary data. However, the type of data representing the setting information 603 does not necessarily have to be binary data.

Figures 7A, 7B:
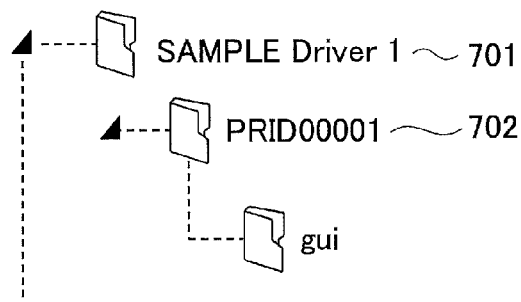
FIGS. 7A and 7B are diagrams illustrating another exemplary configuration of setting information for each user according to the first embodiment.

FIGS. 7A and 7B illustrate another exemplary configuration of user setting information according to the first embodiment. FIG. 7A illustrates a portion of the hierarchical structure of the HKCU registry of the OS 401, for example. In the example of FIG. 7A, an entry of a logical printer ID "PRID00001" 702 of a logical printer is included in an entry of a logical printer name "SAMPLE Driver 1" 701 of the logical printer. In the example of FIG. 7A, the association between the logical printer name and the logical printer ID is indicated by the hierarchical structure. That is, the hierarchical structure of FIG. 7A itself constitutes information indicating the association between the logical printer name and the logical printer ID. Further, as illustrated in FIG. 7B, in the entry of the logical printer ID "PRID00001" 702, the logical printer name and the logical printer ID are stored in association with each other.

As described above, information indicating the association between a logical printer name and a logical printer ID may be stored using the logical printer name as a key as illustrated in FIG. 6, or the information may be stored in an entry of the logical printer ID 'PRID00001" 702 as illustrated in FIG. 7A, for example.

Similarly, information indicating the association between a logical printer ID and setting information of the corresponding logical printer may be stored using the logical printer ID as a key as illustrated in FIG. 6, or the information may be stored in an entry of the logical printer ID, for example.

Moreover, the storage format of the user setting information 412 stored in the first storage area 403 is not particularly limited as long as setting information of a logical printer may be identified based on the logical printer ID of the logical printer and the logical printer name of the logical printer.

Note that in the above descriptions, the first storage area 403 is assumed to be the HKCU storage area within the registry of the OS 401. However, in other embodiments, the OS 401 may provide a file as a storage destination for storing setting information of each user (e.g. C:¥Users¥User01¥AppData¥Roaming¥XXXX). In this way, the setting management unit 406 may use a storage area other than the registry provided by the OS 401 as the first storage area 403.

<Process Flow>

(Setting Information Acquisition Process)

Figure 8:
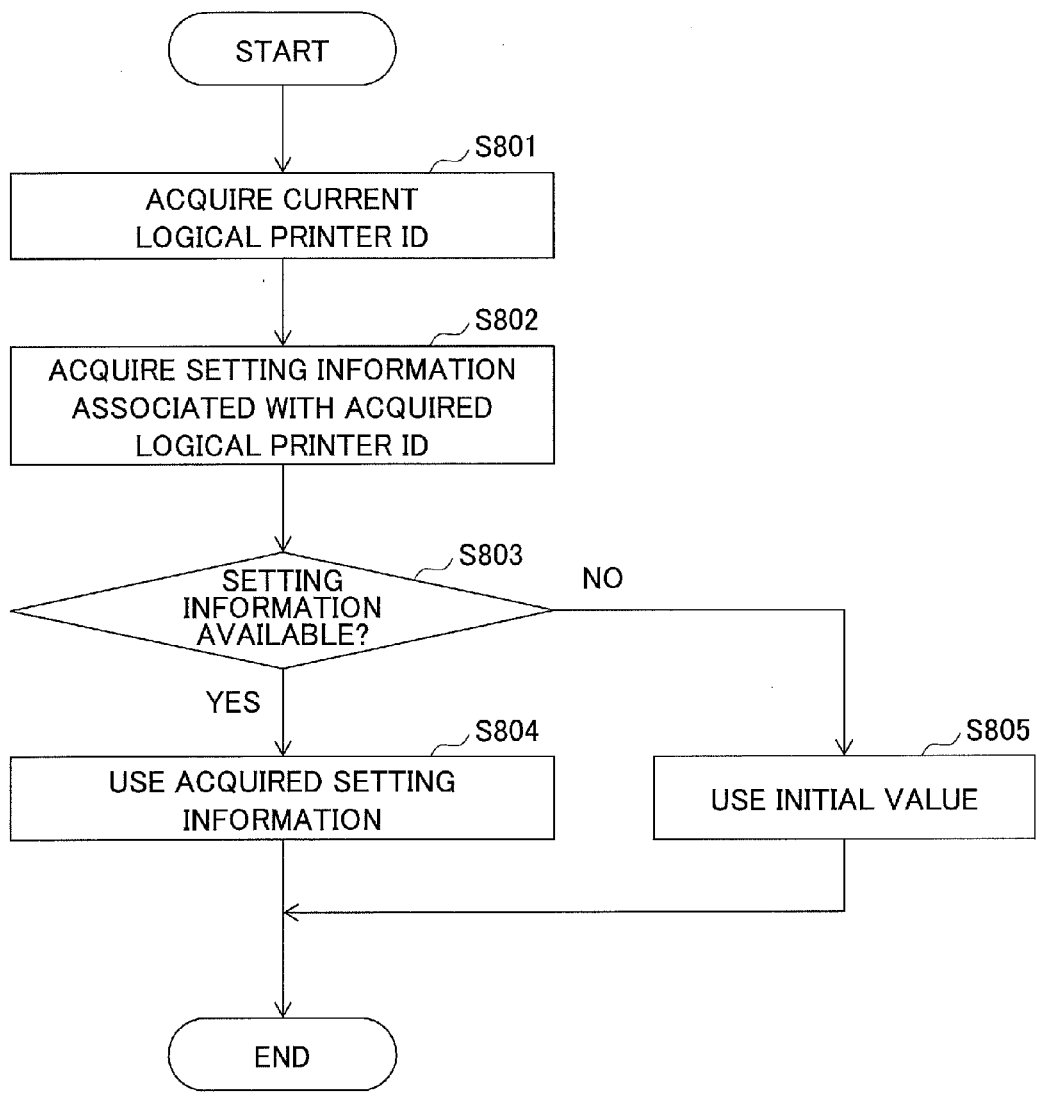
FIG. 8 is a flowchart illustrating an exemplary setting information acquisition process according to the first embodiment.

FIG. 8 is a flowchart illustrating an exemplary setting information acquisition process according to the first embodiment. In the acquisition process of FIG. 8, the acquisition unit 411 acquires setting information of a predetermined printer from the user setting information 412 stored in the first storage area 403.

In step S801, the acquisition unit 411 of the printer driver 402 acquires a logical printer ID of a current logical printer (e.g. logical printer to be used for printing) from the driver setting information 413 stored in the second storage area 404.

In step S802, the acquisition unit 411 performs a process of acquiring setting information associated with the current logical printer ID from the user setting information 412 stored in the first storage area 403. Note, however, that upon performing the process of step S802, there may be cases where the setting information associated with the current logical printer ID is not included in the user setting information 412 stored in the first storage area 403. Thus, in step S803, the acquisition unit 411 proceeds to different process steps depending on whether setting information associated with the current logical printer ID is included in the user setting information 412 stored in the first storage area 403.

If setting information associated with the current logical printer ID is available (YES in step S803), the acquisition unit 411 uses the acquired setting information associated with the current logical printer ID as setting information of the current logical printer (step S804). On the other hand, if there is no setting information stored in association with the current logical printer ID (NO in step S803), the acquisition unit 411 uses an initial value (default value) of the printer driver 402 as setting information of the current logical printer (step S805).

By performing the above process, the following processing results may be expected.

For example, in a case where a new logical printer is created, setting information of the new logical printer would not be stored in the user setting information 412. Accordingly, the initial value of the printer driver 402 may be used as setting information of the new logical printer in performing subsequent process operations.

Also, in a case where the logical printer name of a logical printer has been changed, setting information of the logical printer stored in association with the previous logical printer name of the logical printer may be acquired based on the logical printer ID of the logical printer. That is, because the above acquisition process is not affected by the logical printer name, the corresponding setting information of the logical printer may be acquired even if the logical printer name of the logical printer has been changed.

Further, in a case where a logical printer is deleted and a new logical printer with the same logical printer name as that of the deleted logical printer is created, because a new (updated) logical printer ID is assigned to the new logical printer, the initial value of the printer driver 402 may be used as setting information of the new logical printer. That is, because a new logical printer ID unique to the new logical printer is issued, the above acquisition process may use the initial value of the printer driver 402 rather than acquiring and using the setting information of the deleted logical printer.

As described above, processing results as expected/desired may be achieved by the above acquisition process.

(Setting Information Storage Process)

Figure 9:
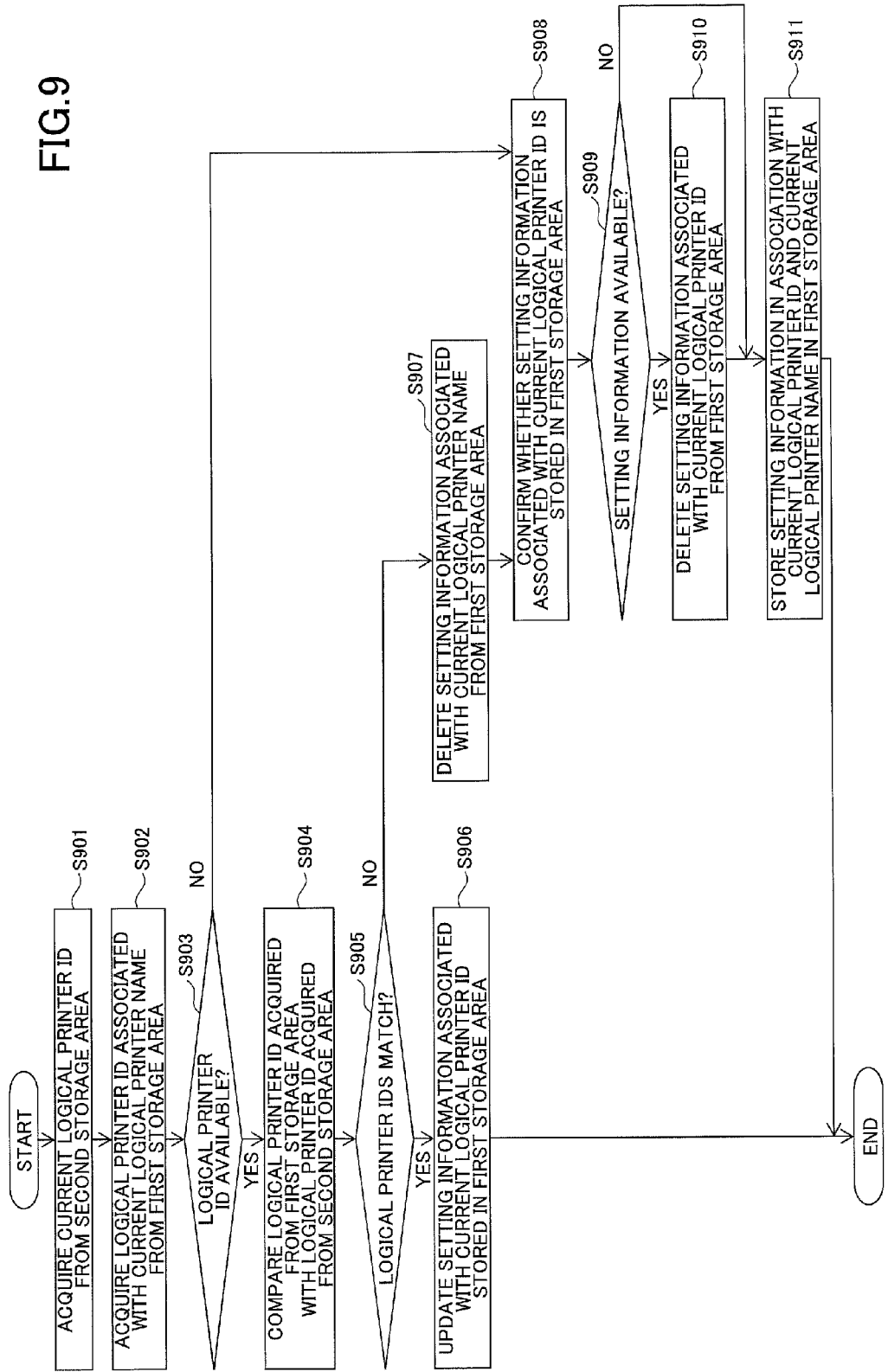
FIG. 9 is a flowchart illustrating an exemplary setting information storage process according to the first embodiment.

FIG. 9 is a flowchart illustrating an exemplary setting information storage process according to the first embodiment. The storage process of FIG. 9 includes a process in which the storage unit 409 stores setting information of a logical printer in the user setting information 412 of the first storage area 403, and a process in which the deletion unit 410 deletes unnecessary information stored in the user setting information 412.

Note that the storage process of FIG. 9 is merely an illustrative example, and in other examples, the process of the deletion unit 410 deleting unnecessary information may be performed separately from the process of the storage unit 409 storing the setting information of a logical printer.

In step S901, the storage unit 409 of the printer driver 402 acquires a current logical printer ID associated with a current logical printer from the driver setting information 413 stored in the second storage area 404.

In step S902, the storage unit 409 acquires a logical printer ID associated with a current logical printer name of the current logical printer from the user setting information 412 stored in the first storage area 403.

In step S903, the storage unit 409 proceeds to different process steps depending on whether a logical printer ID associated with the current logical printer name is included in the user setting information 412 stored in the first storage area 403. If a logical printer ID associated with the current logical printer name is available (YES in step S903), the storage unit 409 proceeds to step S904. On the other hand, if no logical printer ID is stored in association with the current logical printer name (NO in step S903), the storage unit 409 proceeds to step S908.

In step S904, the storage unit 409 compares the logical printer ID associated with the current logical printer name acquired from the first storage area 403, and the current logical printer ID acquired from the second storage area 404. If the logical printer IDs do not match, this means that the logical printer ID associated with the current logical printer name has been changed. This may occur in a case where a logical printer has been deleted and the current logical printer has been newly created with the same logical printer name as that of the deleted logical printer, or a case where the logical printer name of the current logical printer has been changed to a previously-existing logical printer name.

In step S905, the storage unit 409 proceeds to different process steps depending on whether the logical printer ID associated with the current logical printer name acquired from the first storage area 403 matches the current printer ID acquired from the second storage area 404. If the two logical printer IDs match (YES in step S905), the storage unit 409 proceeds to step S906. On the other hand, if the two logical printer IDs do not match (NO in step S905), the process proceeds to step S907.

When the process proceeds to step S906, the storage unit 409 updates (e.g. overwrites) setting information that is stored in association with the current logical printer ID and the current logical printer name of the current logical printer in the user setting information 412 of the first storage area 403.

On the other hand, when the process proceeds to step S907, the deletion unit 410 deletes setting information that is stored in association with the current logical printer name of the current logical printer from the user setting information 412 of the first storage area 403 and proceeds to step S908.

In step S908, the deletion unit 410 checks whether the user setting information 412 stored in the first storage area 403 includes setting information associated with the current logical printer ID of the current logical printer. Note that because the logical printer ID is a value uniquely assigned to each logical printer, no two logical printers can have the same logical printer ID. Therefore, setting information that is stored in association with the current logical printer ID and a logical printer name other than the current logical printer name would be unnecessary information.

In step S909, the deletion unit 410 proceeds to different process steps depending on whether the user setting information 412 stored in the first storage area 403 includes setting information associated with the current logical printer ID of the current logical printer. If the user setting information 412 stored in the first storage area 403 includes setting information associated with the current logical printer ID of the current logical printer (YES in step S909), the deletion unit 410 proceeds to step S910. On the other hand, if the user setting information 412 stored in the first storage area 403 does not include setting information associated with the current logical printer ID of the current logical printer (NO in step S909), the process proceeds to step S911.

In step S910, the deletion unit 410 deletes the setting information associated with the current logical printer ID of the current logical printer from the user setting information 412 stored in the first storage area 403.

In step S911, the storage unit 409 stores setting information of the current logical printer in the user setting information 412 of the first storage area 403 in association with the logical printer name and the logical printer ID of the current logical printer.

By performing the above process steps, the storage unit 409 may store setting information of the current logical printer in the user setting information 412 of the first storage area 403 in association with the logical printer name and the logical printer ID of the current logical printer.

Note that preferably, the storage unit 409 stores the logical printer ID of the current logical printer and the setting information of the current logical printer in association with each other, and also stores the logical printer name of the current logical printer and the logical printer ID of the current logical printer in association with each other. In this way, for example, the acquisition process of FIG. 8 including the process of the acquisition unit 411 acquiring setting information associated with a current logical printer ID from the user setting information 412 stored in the first storage area 403 may be facilitated.

Also, the deletion unit 410 deletes setting information stored in association with the current logical printer ID of the current logical printer and a logical printer name other than the current logical printer name of the current logical printer from the user setting information 412 stored in the first storage area 403.

Further, the deletion unit 410 deletes setting information that is stored in association with the current logical printer name of the current logical printer and a logical printer ID other than the current logical printer ID of the current logical printer from the user setting information 412 stored in the first storage area 403.

Second Embodiment

As a second embodiment of the present invention, process operations for transferring setting information of a logical printer upon switching a printer driver from a conventional printer driver to the printer driver according to the first embodiment is described.

<Functional Configuration>

Figure 10:
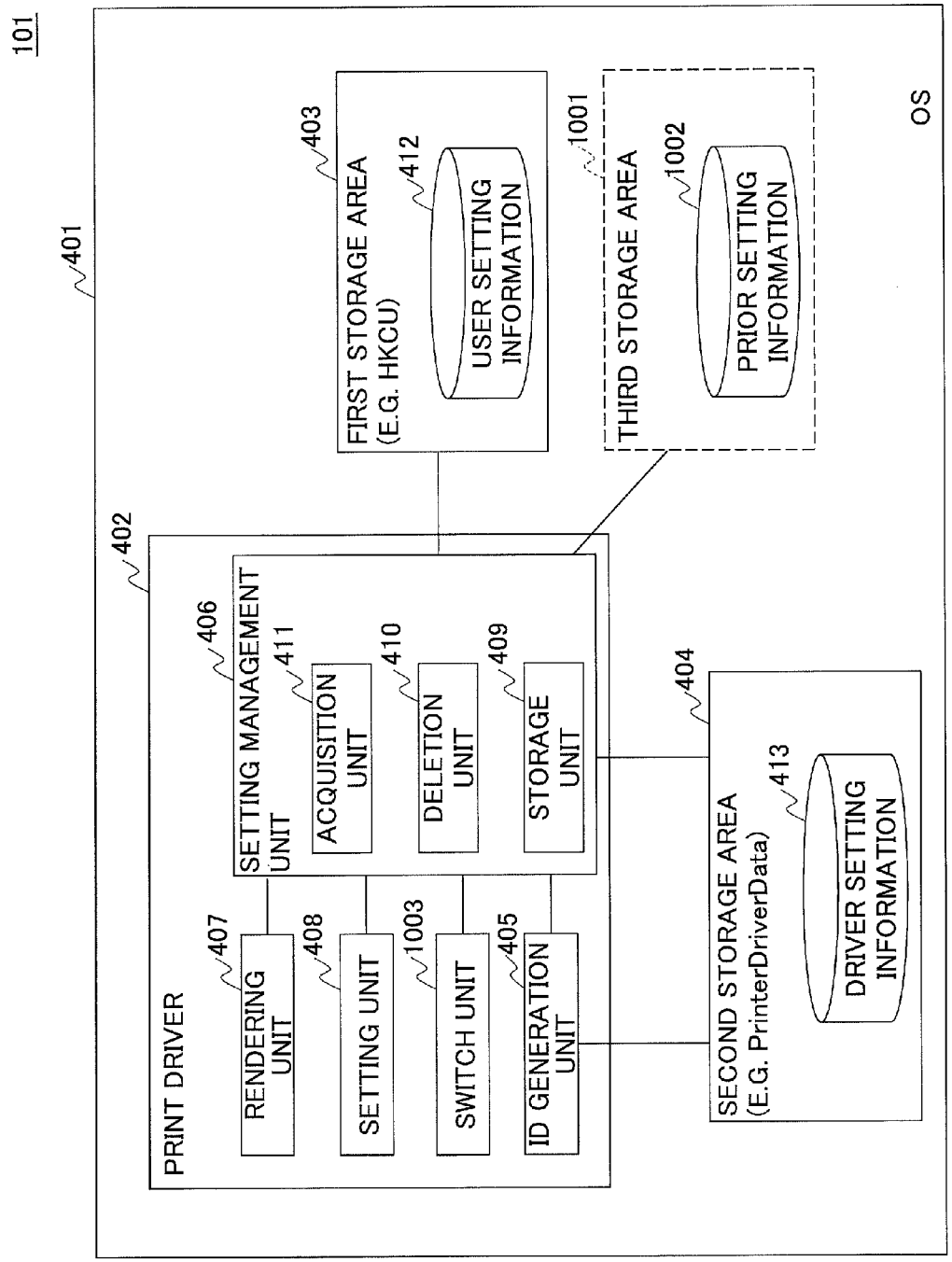
FIG. 10 is a block diagram illustrating an exemplary functional configuration of the information processing apparatus according to a second embodiment of the present invention.

FIG. 10 is a block diagram illustrating an exemplary functional configuration of the information processing apparatus 101 according to the second embodiment. In FIG. 10, the information processing apparatus 101 includes a third storage area 1001, prior setting information 1002 stored in the third storage area 1001, and a switch unit 1003 in addition to the functional features of the first embodiment as illustrated in FIG. 4. Note that descriptions of features of the present embodiment that are substantially identical to those of the first embodiment as illustrated in FIG. 4 are omitted. That is, the following descriptions mainly relate to the differences between the first and second embodiments.

The third storage area 1001 is a storage area that stores prior setting information 1002 corresponding to setting information of a logical printer that was stored by a conventional printer driver. Although the third storage area 1001 may vary depending on the configuration of the conventional printer driver, for example, like the first storage area 403, the third storage area 1001 may be included in the HKCU storage area of the registry in which setting information for each user is managed by the OS 401. Alternatively, the third storage area 1001 may be a storage area independently managed by the printer drive as in Patent Document 1, for example.

Also, the printer driver 402 according to the present embodiment is configured to enable switching between the above-described storage process for storing setting information of a logical printer according to the first embodiment (also referred to as "new storage method" hereinafter) and a conventional storage process by the conventional printer driver for storing setting information of a logical printer in the third storage area 1001 according to a second embodiment (also referred to as "old storage method" hereinafter), for example.

The switch unit 1003 is for switching between storing setting information of a logical printer using the new storage method and storing setting information of a logical printer using the old storage method. In this way, for example, in a case where storing setting information of a logical printer according to the old storage method is desirable, a user may select to store setting information of a logical printer according to the old storage method. Note that the storage method set up by the switch unit 1003 may be stored in the driver setting information 413 of the second storage area 404 (e.g. "PrinterDriverData"), for example.

<Process Flow>

(Setting Information Acquisition Process)

Figure 11:
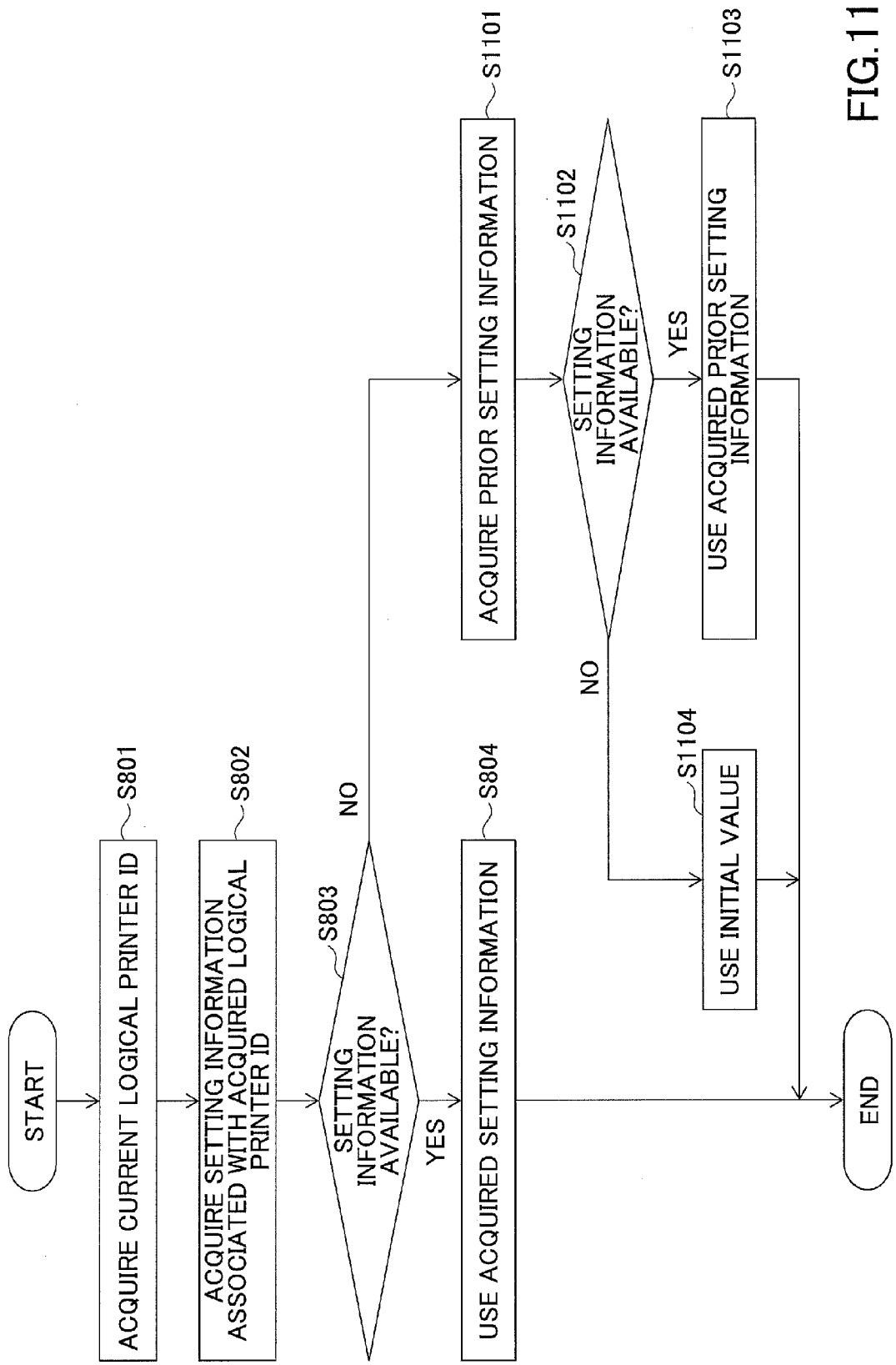
FIG. 11 is a flowchart illustrating an exemplary setting information acquisition process according to the second embodiment.

FIG. 11 is a flowchart illustrating an exemplary setting information acquisition process according to the second embodiment. Note that the processes of steps S801 to S804 of FIG. 11 may be substantially identical to the setting information acquisition process according to the first embodiment as illustrated in FIG. 8. The following descriptions mainly relate to features of the present embodiment that differ from the first embodiment.

In step S803, if the acquisition unit 411 determines that setting information associated with the current logical printer ID of the current logical printer is not stored in the user setting information 412, the process proceeds to step S1101.

In step S1101, the acquisition unit 411 acquires from the prior setting information 1102 stored in the third storage area 1101, setting information of the current logical printer stored using the old storage method.

In step S1102, the acquisition unit 411 proceeds to different process steps depending on whether setting information of the current logical printer stored using the old storage method could be acquired from the prior setting information 1102 stored in the third storage area 1101 in step S1101.

If setting information of the current logical printer stored using the old storage method could be acquired from the prior setting information 1102 stored in the third storage area 1101 (YES in step S803), the acquisition unit 411 uses the acquired prior setting information (step S1103). On the other hand, if setting information of the current logical printer stored using the old storage method could be acquired from the prior setting information 1102 stored in the third storage area 1101 (NO in step S803), the acquisition unit 411 uses the initial value of the printer driver 402 (step S1104).

By performing the above process, for example, in a case where the printer driver is upgraded from a conventional printer driver implementing the old storage method to the printer driver according to the present embodiment, setting information of a logical printer stored using the old storage method may be effectively utilized.

(Setting Information Storage Process)

The printer driver 402 is preferably capable of switching to storing setting information of a logical printer using the old storage method in response to a request from the user or the system, for example. In the present embodiment, it is assumed that the switch unit 1003 can be used to select whether to use the new storage method (storage method according to the first embodiment) or the old storage method (storage method according to the second embodiment that is implemented by the conventional printer driver).

Figure 12:
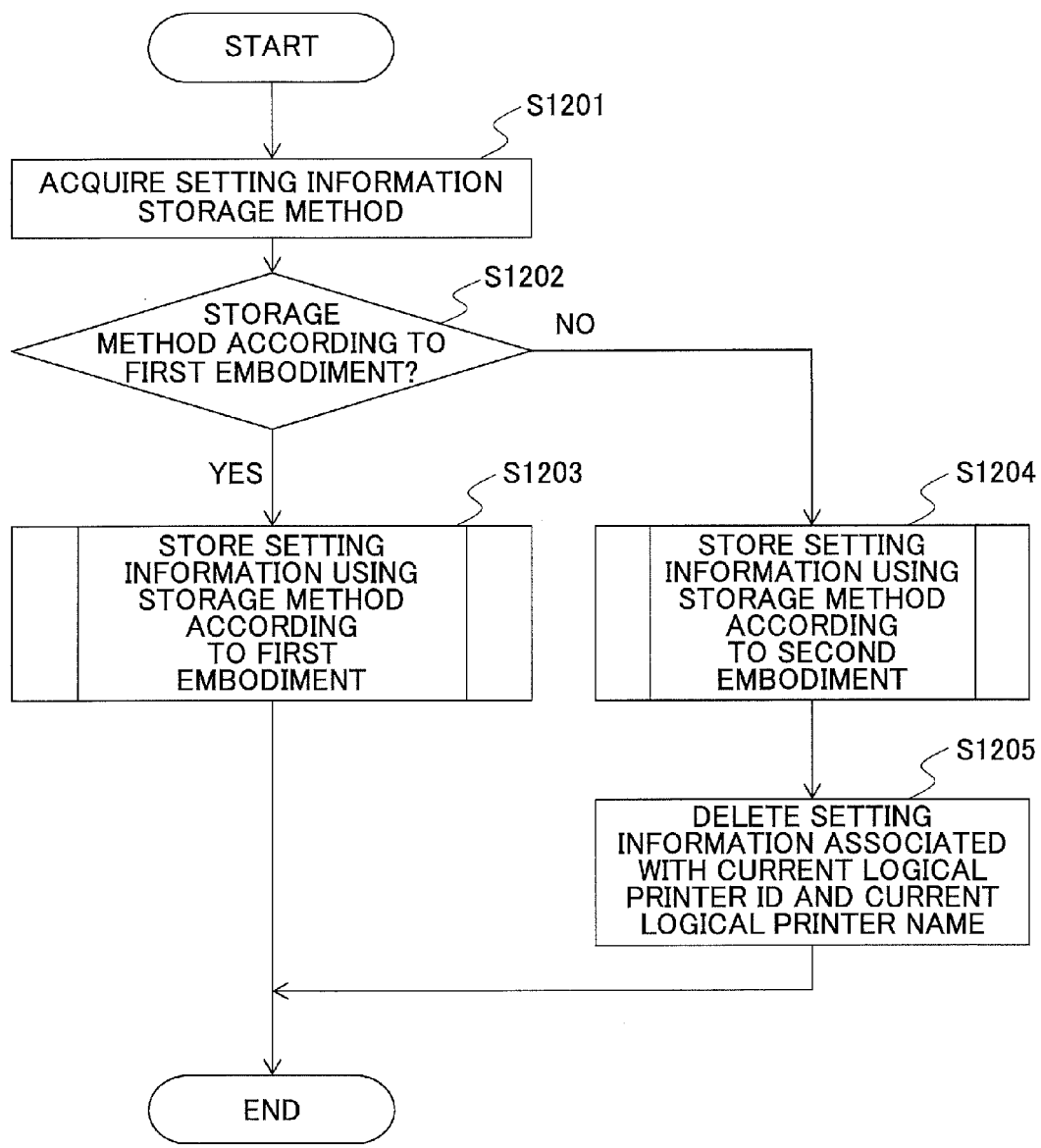
FIG. 12 is a flowchart illustrating an exemplary setting information storage process according to the second embodiment.

FIG. 12 is a flowchart illustrating an exemplary setting information storage process according to the second embodiment.

In step S1201, the storage unit 409 acquires the storage method for storing the setting information of the current logical printer from the driver setting information 413 of the second storage area 404, for example.

In step S1202, the storage unit 409 proceeds to different process steps depending on whether the storage method acquired in step S1201 corresponds to the storage method according to the first embodiment (new storage method).

If the acquired storage method for storing the setting information of the current logical printer corresponds to the storage method according to the first embodiment (YES in step S1202), the storage unit 409 stores the setting information of the current logical printer using the storage method according to the first embodiment (see FIG. 9) (step S1203).

On the other hand, if the acquired storage method for storing the setting information of the current logical printer does not corresponds to the storage method according to the first embodiment (NO in step S1202), the storage unit 409 stores the setting information of the current logical printer using the old storage method (second embodiment) (step S1204). In this case, although the specific storage process may vary depending on the particular version of the conventional printer driver, for example, because the printer drivers are typically provided by the same vendor (e.g., printer manufacturer), storing setting information using the old storage method may be performed with relative ease.

Preferably, in step S1205, the deletion unit 410 deletes setting information stored in the user setting information 412 of the first storage area 403 in association with the logical printer ID and the logical printer name of the current logical printer.

By performing the above process, the printer driver 402 be able to switch to storing setting information of a logical printer using the old storage method in response to a request from the user or the system, for example.

Third Embodiment

In the first and second embodiments, the printer driver 402 is able to use setting information of a logical printer stored in the user setting information 412 of the first storage area 403 that is managed with respect to each user by the OS 401.

In one preferred embodiment, when setting information stored and managed by the OS 401 is newer than setting information of a logical printer stored in the user setting information 412 of the first storage area 430 that is managed by the printer driver 402, the newer setting information managed by the OS 401 is preferably used by the printer driver 402. In this way, newly added functions and/or updated information may be used, for example.

<Functional Configuration>

Figure 13:
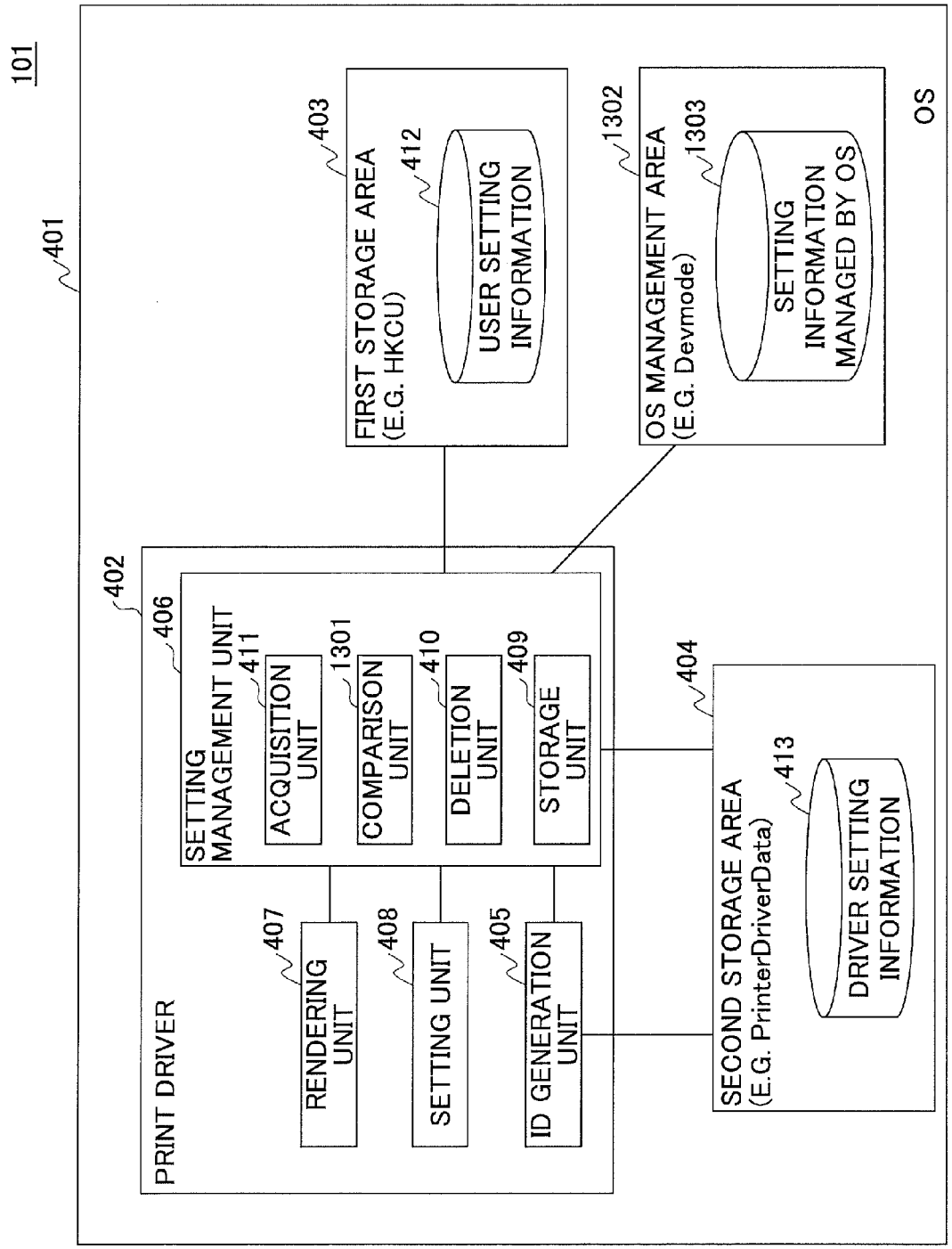
FIG. 13 is a block diagram illustrating an exemplary functional configuration of the information processing apparatus according to a third embodiment of the present invention.

FIG. 13 is a block diagram illustrating an exemplary functional configuration of the information processing apparatus 101 according to a third embodiment of the present invention. In FIG. 13, the information processing apparatus 101 includes a comparison unit 1301 and an OS management area 1302 that stores setting information 1303 managed by the OS 401 in addition to the functional features of the information processing apparatus 101 according to the first embodiment as illustrated in FIG. 4. Note that descriptions of features of the present embodiment that may be substantially identical to those of the first embodiment as illustrated in FIG. 4 are omitted, and the following descriptions mainly relate to features of the present embodiment that differ from the first embodiment.

The comparison unit 1301 compares the setting information 1303 managed by the OS 401 and the setting information managed by the setting management unit 406 of the printer driver 402, and determines which setting information is newer. For example, the comparison unit 1301 may compare date/time information such as the storage date/time of the setting information managed by the OS 401 and date/time information such as the storage date/time of the setting information managed by the setting management unit 406 to determine which setting information is newer.

The OS management area 1302 is a storage area such as the Devmode structure of the OS 401, for example. The printer driver 402 does not store setting information in the OS management area 1302.

Also, in the present embodiment, upon storing setting information of a logical printer in the first storage area 403 in association with the logical printer ID and the logical printer name of the logical printer, the storage unit 409 also stores date/time information such as the storage date/time of the setting information.

<Process Flow>

Figure 14:
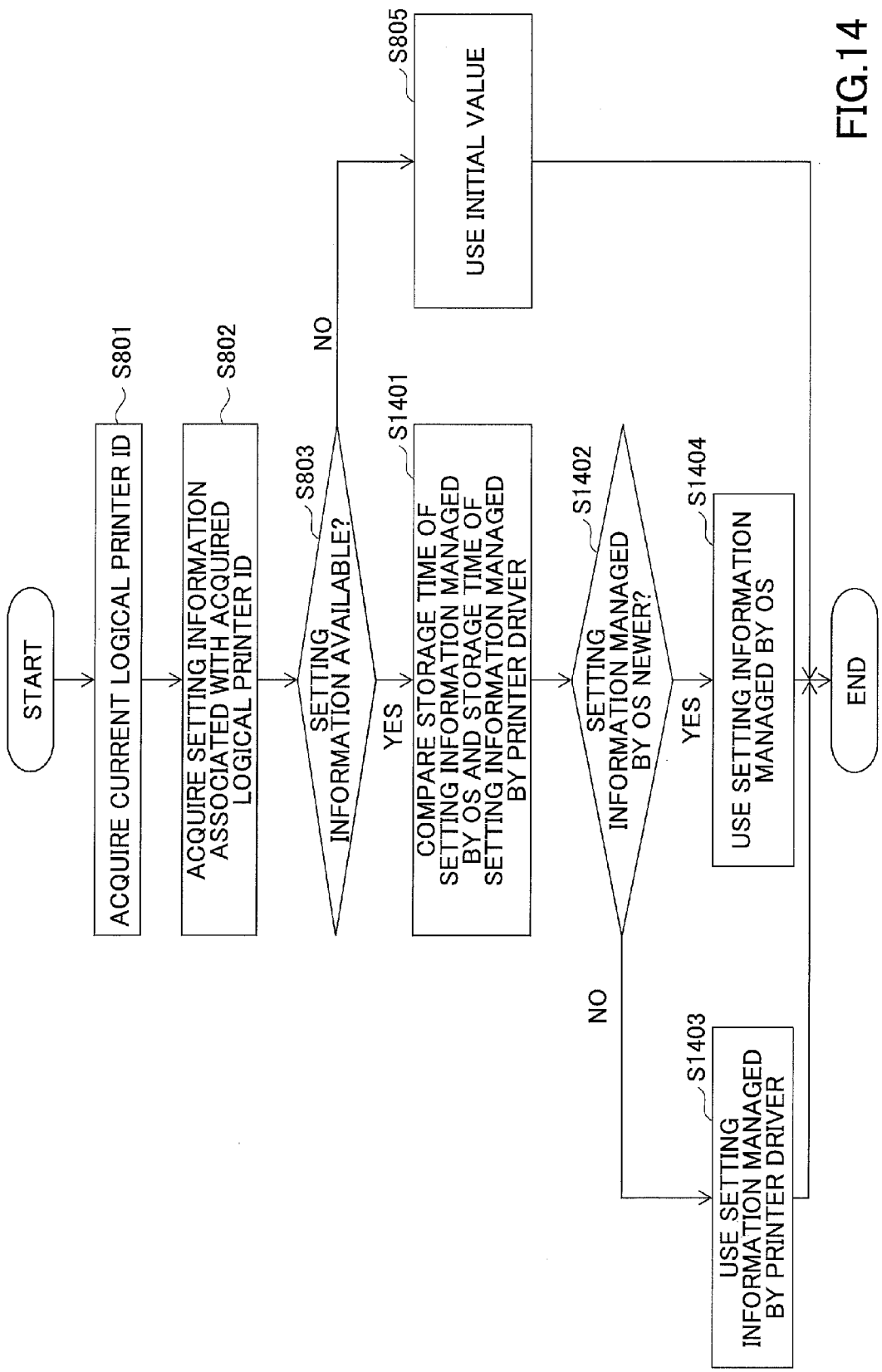
FIG. 14 is a flowchart illustrating an exemplary setting information acquisition process according to the third embodiment.

FIG. 14 is a flowchart illustrating an exemplary setting information acquisition process according to the third embodiment. Note that processes of steps S801 to S803 and step S805 of FIG. 14 may be substantially identical to the corresponding process steps of the setting information acquisition process according to the first embodiment as illustrated in FIG. 8. The following descriptions mainly relate to features of the present embodiment that differ from the first embodiment.

In step S803, if the acquisition unit 411 determines that setting information associated with the current logical printer ID of the current logical printer is stored in the user setting information 412 of the first storage area 403, the process proceeds to step S1401.

In step S1401, the comparison unit 1301 compares the setting information managed by the OS 401 and the setting information managed by the setting management unit 406 of the printer driver 402, and determines which setting information is newer.

In step S1402, the acquisition unit 411 proceeds to different process steps depending on whether the setting information managed by the OS 401 is newer than the setting information managed by the setting management unit 406 of the printer driver 402.

If it is determined that the setting information managed by the OS 401 is not newer than the setting information managed by the setting management unit 406 of the printer driver 402 (NO in step S1402), the acquisition unit 411 uses the setting information of the logical printer managed by the setting management unit 406 of the printer driver 402 (step S1403).

On the other hand, if it is determined that the setting information managed by the OS 401 is newer than the setting information managed by the setting management unit 406 of the printer driver 402 (YES in step S1402), the acquisition unit 411 uses the setting information managed by the OS 401 (step S1404).

By performing the above acquisition process, when the setting information of the printer driver 402 managed by the OS 401 is updated, for example, the printer driver 402 may be able to use the updated setting information managed by the OS 401.

Fourth Embodiment

As a fourth embodiment of the present invention, process operations to be implemented in a case where a logical printer is deleted and a new logical printer with the same logical printer name as that of the deleted logical printer is created are described.

Normally, after the user deletes a logical printer, settings of the deleted logical printer are not handed off to a new logical printer even when the new logical printer is created with the same logical printer name as that of the deleted logical printer. However, there may be cases where the user wishes to continue using logical printer settings with a fixed logical printer name such as "normal output" in a system constructed by the user. For example, when the user buys a new printer and replaces an old printer driver with a new printer driver, the user may wish to continue using settings of the old printer driver that has been used before replacement of the printer.

The present embodiment relates to an exemplary case of handing off logical printer settings that have been previously used by the user.

<Functional Configuration>

Figure 15:
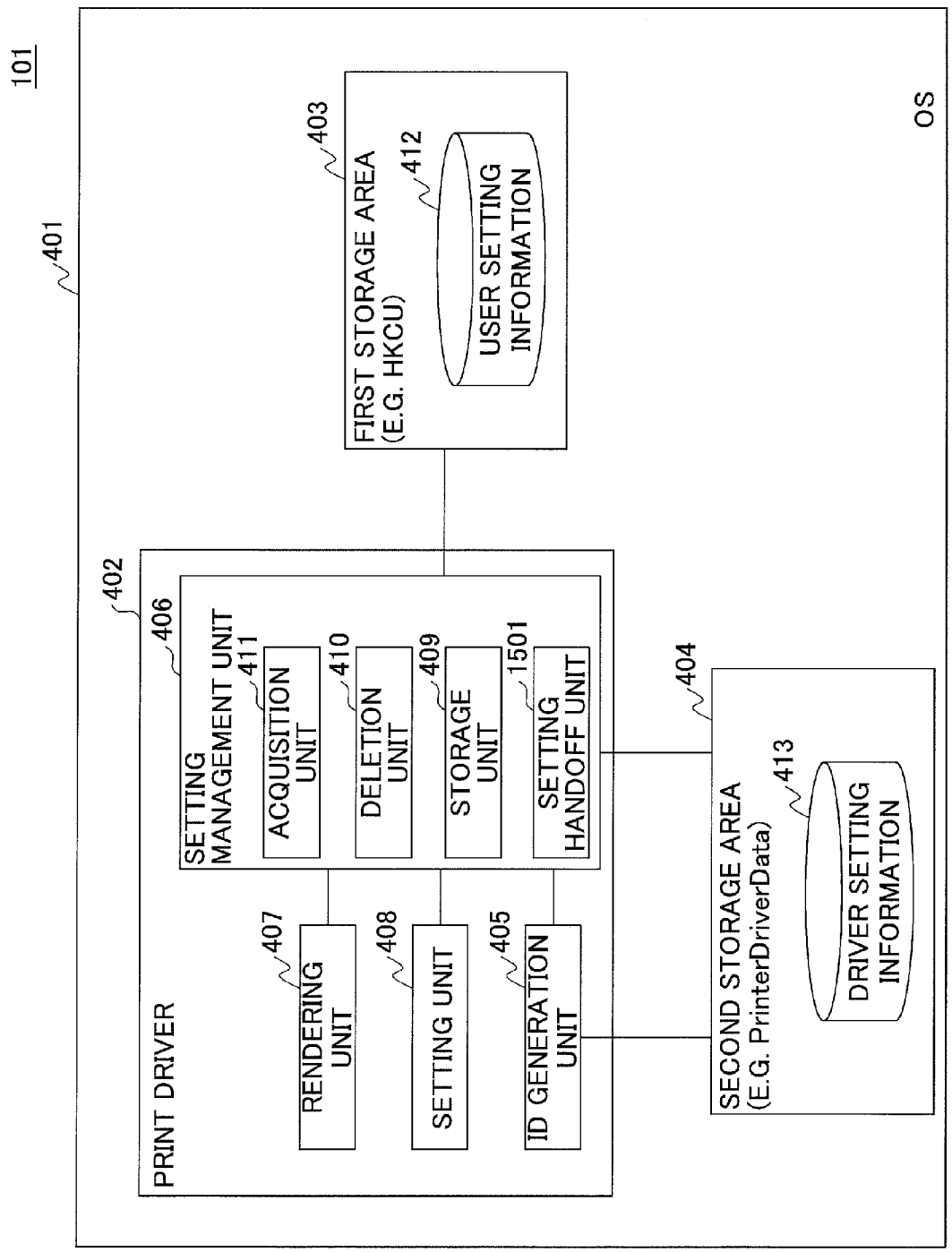
FIG. 15 is a block diagram illustrating an exemplary functional configuration of the information processing apparatus according to a fourth embodiment of the present invention.

FIG. 15 is a block diagram illustrating an exemplary functional configuration of the information processing apparatus 101 according to the fourth embodiment. In FIG. 15, the printer driver 402 of the information processing apparatus 101 includes a setting handoff unit 1501 in addition to the functional features of the printer driver 402 according to the first embodiment as illustrated in FIG. 4. Note that other features of the information processing apparatus 101 shown in FIG. 15 may be substantially identical to those of the first embodiment as illustrated in FIG. 4. The following descriptions mainly relate to features of the present embodiment that differ from the first embodiment.

The setting handoff unit 1501 performs a handoff process when the user creates a new logical printer such that setting information of a logical printer stored in the user setting information 412 of the first, storage area 403 in association with the same logical printer name as that of the new logical printer may be handed off to the new logical printer, for example.

<Process Flow>

Figure 16:
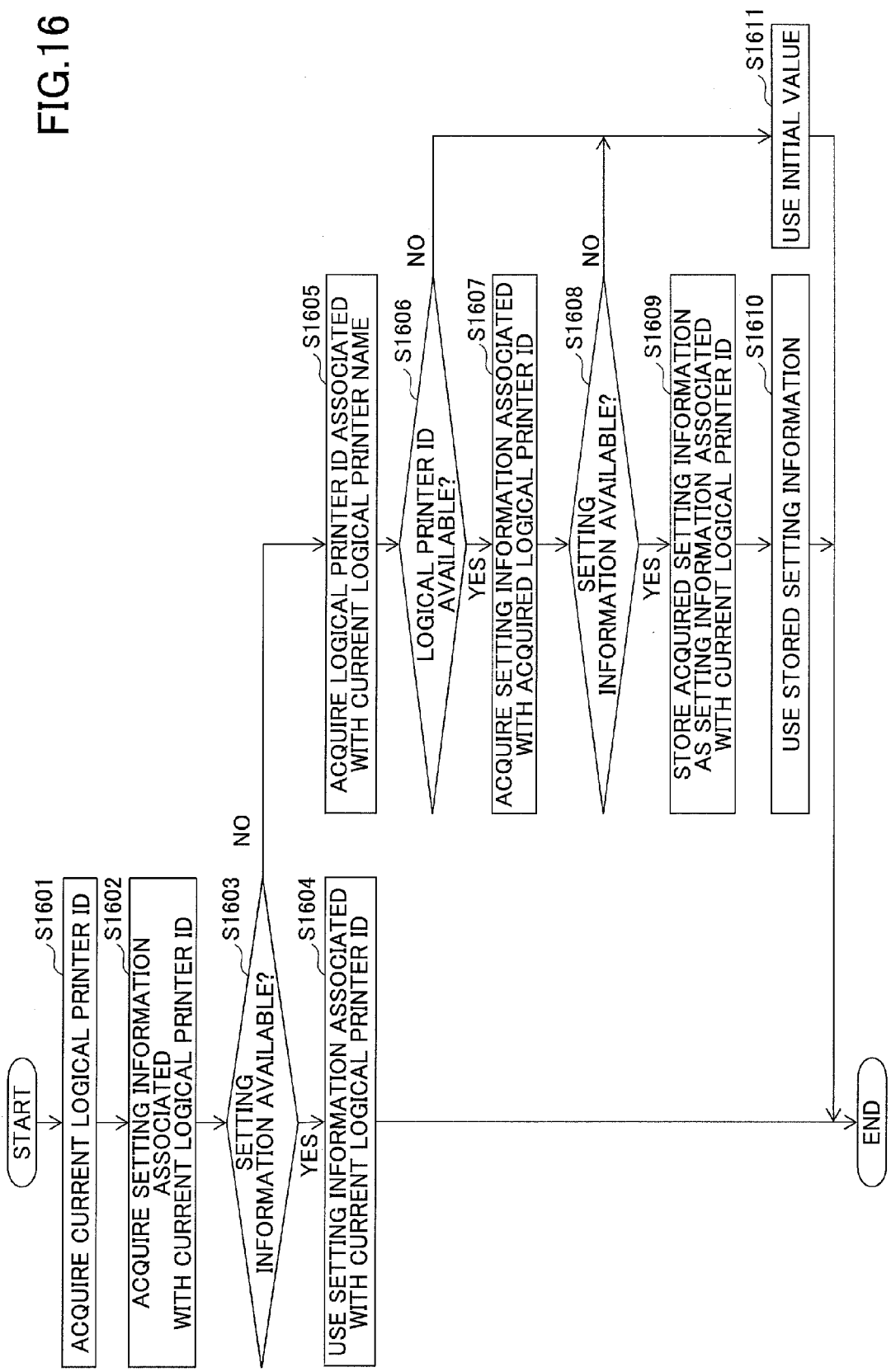
FIG. 16 is a flowchart illustrating an exemplary setting information acquisition process according to the fourth embodiment.

FIG. 16 is a flowchart illustrating an exemplary setting information acquisition process according to the fourth embodiment. The setting information acquisition process of FIG. 16 includes process steps to be implemented in a case where the user has previously deleted a logical printer and is creating a new logical printer with the same logical printer name as the deleted logical printer (steps S1606 to S1611) in addition to process steps of the setting information acquisition process according to the first embodiment as illustrated in FIG. 8.

In the following descriptions of the present embodiment, as an illustrative example, it is assumed that the user has previously created a logical printer with a logical printer name "SAMPLE Driver 1" and a logical printer ID "PRID0001". Also, it is assumed that when the logical printer was created, for example, setting information 1701 of the logical printer such as that illustrated in FIG. 17A was stored in the first storage area 403. Further, it is assumed that at the time the acquisition process of FIG. 16 is started, the logical printer previously created by the user has been deleted, and the user is creating a new logical printer with the same logical printer name "SAMPLE Driver 1" as the previously created logical printer, and the logical printer ID of the new logical printer is "PRID00102".

In step S1601, the acquisition unit 411 of the printer driver 402 acquires the logical printer ID of the current logical printer "PRID00102" from the driver setting information 413 stored in the second storage area 404.

In step S1602, the acquisition unit 411 acquires from the user setting information 412 stored in the first storage area 403 setting information associated with the current logical printer ID. Note that in performing step S1602, there may be cases where setting information associated with the current logical printer ID is not included in the user setting information 412 stored in the first storage area 403. Thus, in step S1603, the acquisition unit 411 proceeds to different process steps depending on whether setting information associated with the current logical printer ID is included in the user setting information 412 stored in the first storage area 403.

If setting information associated with the current logical printer ID is included in the user setting information 412 stored in the first storage area 403 (YES in step S1603), the acquisition unit 411 acquires and uses the setting information associated with the current logical printer ID (step S1604). On the other hand, if setting information associated with the current logical printer ID is not included in the user setting information 412 stored in the first storage area 403 (NO in step S1603), the acquisition unit 411 proceeds to step S1605. In this way, a setting information handoff process including step S1605 and subsequent process steps is performed.

In step S1605, the setting handoff unit 1501 acquires a logical printer ID associated with the current logical printer name. For example, the setting handoff unit 1501 may acquire from the first storage area 403 a value representing the logical printer ID associated with the current printer name "SAMPLE Driver 1". In a case where the current logical printer name "SAMPLE Driver 1" has previously been used, setting information associated with the logical printer name may still be stored in the first storage area 403. As described above, in the present example, it is assumed that the setting information 1701 as illustrated in FIG. 17A is stored, and accordingly, the logical printer ID "PRID00001" can be acquired.

In step S1606, the setting handoff unit 1501 proceeds to different process steps depending on whether a logical printer ID associated with the current logical printer name is available.

If a logical printer ID associated with the current logical printer name is available (NO in step S1606), the setting handoff unit 1501 proceeds to step S1611. In step S1611, the acquisition unit 411 uses the initial value of the printer driver as setting information of the current logical printer.

On the other hand, if a logical printer ID associated with the current logical printer name is available (YES in step S1606), the setting handoff unit 1501 proceeds to step S1607.

In step S1607, the setting handoff unit 1501 acquires setting information associated with the acquired logical printer ID. For example, the setting handoff unit 1501 may acquire the setting information "06 58 3F 38 60 1B . . . " of the logical printer with the logical printer ID "PRID00001" from the setting information 1701 of FIG. 17A. Note that the value "06 58 3F 38 60 1B . . . " representing the logical printer setting information is merely an illustrative example of binary data representing the setting information of the logical printer, and the value may also be represented in other various forms.

In step S1608, the setting handoff unit 1501 proceeds to different process steps depending on whether setting information associated with the acquired logical printer ID is available.

If setting information associated with the acquired logical printer ID is not available (NO in step S1608), the setting handoff unit 1501 proceeds to step S1611. On the other hand, if setting information associated with the acquired logical printer ID is available, the setting handoff unit 1501 proceeds to step S1609.

In step S1609, the setting handoff unit 1501 stores the setting information of the logical printer acquired in step S1607 as setting information associated with the current logical printer ID. For example, the setting information "06 58 3F 38 60 1B . . . " acquired in step S1607 may be stored in the first storage area 403 in association with the current logical printer ID "PRID00102" as setting information associated with the current logical printer ID. Note that FIG. 17B illustrates an example of setting information 1702 that may be stored in such a case.

The setting information 1702 illustrated in FIG. 17B includes the current logical printer ID "PRID00102" and the setting information "06 58 3F 38 60 1B . . . " associated with the current logical printer ID "PRID00102" in addition to the setting information 1701 as illustrated in FIG. 17A. Note that in the present case, the value of the setting information associated with the current logical printer ID "PRID00102" inherits the value of the setting information associated with the logical printer ID "PRID00001", and as such, the value of the setting information associated with the current logical printer ID "PRID00102" and the value of the setting information associated with the logical printer ID "PRID00001" are the same value.

In step S1610, the acquisition unit 411 uses the setting information of the logical printer stored by the setting handoff unit 1501 in step S1609 as setting information of the current logical printer.

By performing the above process, in a case where the user deletes a logical printer and subsequently creates a new logical printer with the same logical printer name as the deleted logical printer, the setting information of the deleted logical printer may be handed off and used as the setting information of the new logical printer.

Note that after setting information of a logical printer is handed off, the setting information storage process as illustrated in FIG. 9 may be performed, for example. In such a case, the logical printer ID associated with the logical printer name of the logical printer setting information 1702 illustrated in FIG. 17B may be updated and unnecessary setting information may be deleted, for example.

FIG. 17C illustrates an example of setting information 1703 of the logical printer after the setting information storage process of FIG. 9 has been performed. In the setting information 1703 of FIG. 17C, the current logical printer name "SAMPLE Driver 1" and the current logical printer ID "PRID00102" are stored in association with each other. Further, the logical printer ID "PRID00001" of the deleted logical printer and the setting information of the deleted logical printer are deleted.

Note that in some embodiments, the user may select whether to perform the handoff process for handing off the setting information of the deleted logical printer, for example.

FIG. 18 is a flowchart illustrating another exemplary setting information acquisition process according to the fourth embodiment. Note that the processes of steps S1601 to S1604 and steps S1605 to 1610 of FIG. 18 may be substantially identical to the corresponding process steps of FIG. 16. In the following, process steps of FIG. 18 that differ from the process steps of FIG. 16 are described.

In step S1603, if the acquisition unit 411 determines that there is no setting information associated with the current logical printer ID, the acquisition unit 411 proceeds to step S1801.

Figure 19:
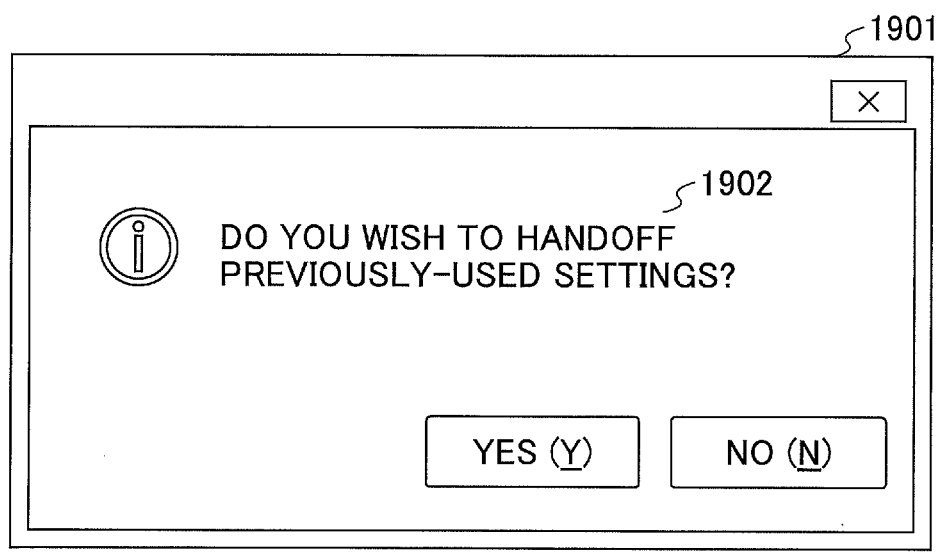
FIG. 19 illustrates an exemplary handoff selection screen according to the fourth embodiment.

In step S1801, the setting handoff unit 1501 may prompt the display unit 207 (see FIG. 2) to display a handoff selection screen, for example. FIG. 19 illustrates an example of a handoff selection screen 1901 that may be displayed is such case.

FIG. 19 illustrates an exemplary display of the handoff selection screen 1901 according to the fourth embodiment. In the example of FIG. 19, the handoff selection screen 1901 displays a message 1902 prompting the user to select whether to hand off previously used settings. The handoff selection screen 1901 also displays a "YES" button and a "NO" button that can be selected by the user.

In step S1802 of FIG. 18, when it is determined that handoff has been selected as a result of the user selecting the "YES" button of the handoff selection screen 1901, for example, the setting handoff unit 1501 proceeds to step S1605. On the other hand, when it is determined that handoff has not been selected as a result of the user selecting the "NO" button of the handoff selection screen 1901, for example, the setting handoff unit 1501 proceeds to step S1611.

By performing the above process, in a case where the user deletes a logical printer and subsequently creates a new logical printer with the same logical printer name as that of the deleted logical printer, the user may be able to select whether to hand off (inherit) the setting information of the deleted logical printer.

Note that the first to fourth embodiments described above may be implemented in combination with other embodiments, for example.

[Other System Configurations]

FIG. 1 illustrates an exemplary basic system configuration of the information processing system 100 according to an embodiment of the present invention. However, the information processing system 100 may have other various system configurations.

Figure 20:
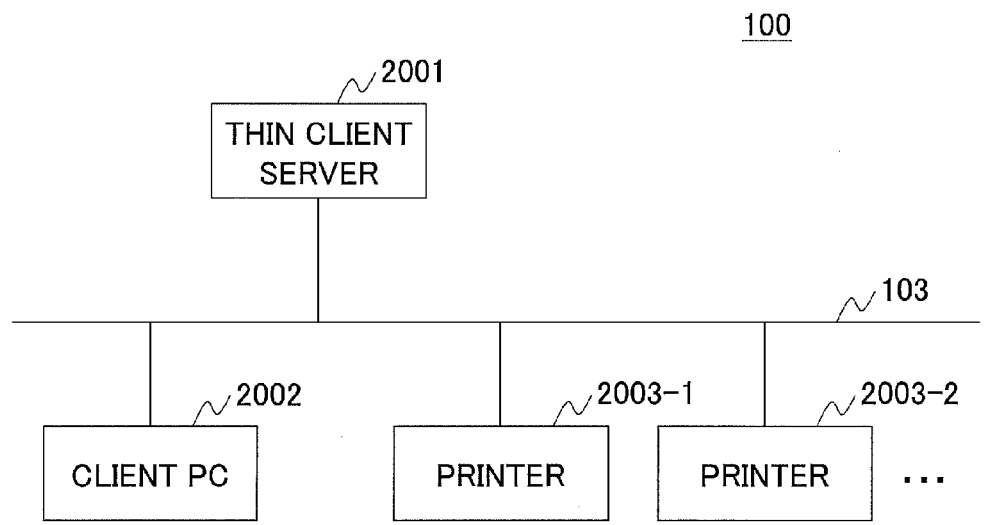
FIG. 20 illustrates another exemplary configuration of the information processing system according to an embodiment of the present invention.

FIG. 20 illustrates another exemplary configuration of the information processing system 100 according to an embodiment of the present invention. In FIG. 20, the information processing system 100 includes a thin client server 2001, a client PC 2002, and a plurality of printers 2003-1 and 2003-2 that are connected to the network 103. Note that although two printers 2003-1 and 2003-2 are illustrated in FIG. 20, the information processing system 100 may include any number of printers (including one or more than two).

The thin client server 2001 is a server that provides a service such as Citrix XenApp (registered trademark) as a virtual environment, for example.

The client PC 2002 is an information processing terminal that uses the virtual environment provided by the thin client server 2001. The user uses the client PC 2002 to establish connection with the thin client server 2001 and use the virtual environment.

The printers 2003-1 and 2003-2 correspond to printers (image forming apparatuses) that can be used in the virtual environment provided by the thin client server 2001.

For example, Citrix XenApp has a function for creating a printer icon of the client PC 2002 in the virtual environment such that the printer icon (logical printer) of the client PC 2002 may also be used in the virtual environment. Note that when implementing such a function, the printer icon name (logical printer name) of the printer icon (logical printer) created in the virtual environment changes each time the client PC 2002 establishes connection with the thin client server 2001.

For example, a printer icon name "Icon A Session 1" assigned to a printer icon during a first connection may be changed to "Icon A Session 2" during a second connection. In such case, setting information of the printer icon (logical printer) that is created each time a connection is established may be accumulated without being deleted. In a large-scale system including a large number of client PCs 2002 and printers 2003, a large amount of unnecessary information may be accumulated.

Thus, according to a preferred embodiment, the printer driver 402 may be used to store and manage setting information of the printer icon (logical printer). In the printer driver 402, the ID generation unit 405 generates a unique logical printer ID for each logical printer (printer icon). Also, the storage unit 409 stores setting information of a logical printer (printer icon) in association with the logical printer ID and the logical printer name (printer icon name) of the logical printer in the user setting information 412 stored in the first storage area 403 that is managed with respect to each user by the OS 401.

Further, the deletion unit 410 deletes unnecessary information from the user setting information 412 stored in the first storage area 403 that is managed with respect to each user by the OS 401 based on the logical printer ID and the logical printer name of the logical printer for which the storage unit 409 is storing setting information. For example, based on the logical printer ID and the logical printer name of a current logical printer for which the storage unit 409 is storing setting information, the deletion unit 410 may delete setting information that is stored in association with the logical printer ID of the current logical printer and a logical printer name other than the logical printer name of the current logical printer.

In this way, for example, when a new logical printer with a new logical printer name is created at the time the client PC-2002 establishes connection with the thin client server 2001, the setting information associated with the old logical printer name of the logical printer may be automatically deleted.

In this way, the printer driver 402 according to the present embodiment may readily use setting information management functions provided by the OS 401 while suppressing an increase in unnecessary information resulting from a change in the logical printer name of a logical printer, for example.

Figure 21:
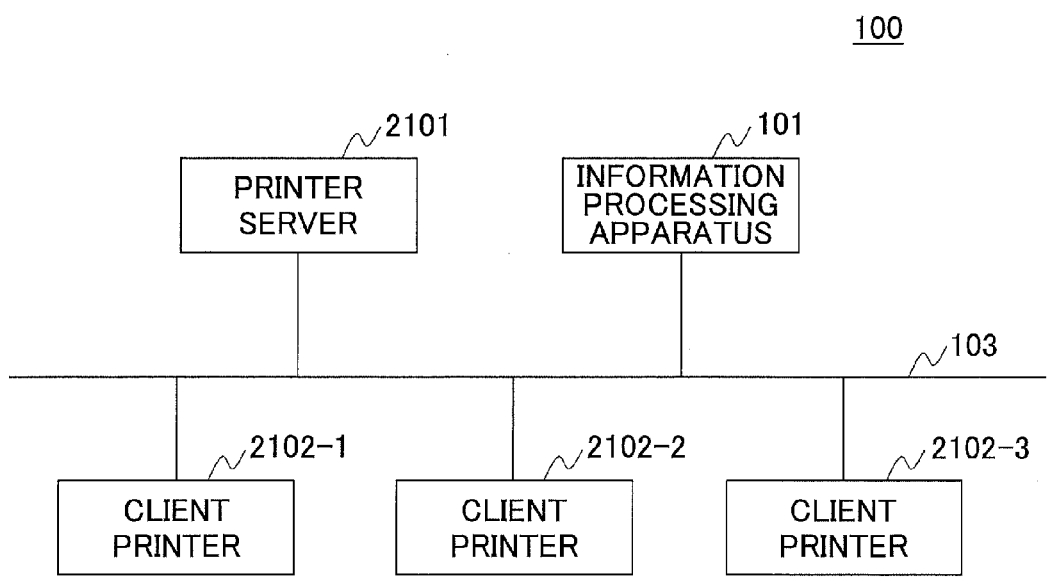
FIG. 21 illustrates another exemplary configuration of the information processing system according to an embodiment of the present invention.

FIG. 21 illustrates another exemplary configuration of the information processing system 100 according to an embodiment of the present invention. In FIG. 21, the information processing system 100 includes the information processing apparatus 101, a print server 2101, and a plurality of client printers 2102-1, 2102-2, and 2102-3 that are connected to the network 103. Note that although three client printers 2102-1 to 2102-3 are shown in FIG. 21 as an illustrative example, the information processing system 100 of the present embodiment may include any number of client printers.

In FIG. 21, the user of the information processing apparatus 101 may use a point-and-print function provided by the OS 401, for example, such that the user may be able to create a connection with a client printer (logical printer) without using a recording medium for installing a printer driver, for example.

The point-and-print function enables synchronization of settings stored in the PrinterDriverData of the registry with the print server 2101 and the client printer 2102. In this way, information on the logical printer ID unique to a logical printer may be transferred (handed off) along with other setting information, and the processes according to the first to fourth embodiments of the present invention for managing setting information of a logical printer in association with the logical printer ID and the logical printer name of the logical printer may be used in the information processing system 100 according to the present embodiment.

<Summary>

According to an embodiment of the present invention, a print control program (402) is provided that causes a computer (101) to act as a generation unit (405) configured to generate identification information unique to each logical printer, a storage unit (409) configured to store setting information of a logical printer in association with identification information unique to the logical printer and name information of the logical printer in a storage area (403) managed with respect to each user by an operating system (401), and a deletion unit (410) configured to delete unnecessary information stored in the storage area (403) based on the identification information unique to the logical printer and the name information of the logical printer.

With such a configuration, setting information of a logical printer may be managed in association with identification information unique to the logical printer and name information of the logical printer in the storage area (403) managed with respect to each user by the operating system (401). Thus, the print control program (402) according to the present embodiment may be able to use setting information management functions provided by the operating system (401) to share and/or transfer (handoff) setting information of a logical printer, for example.

Further, the print control program (402) according to the present embodiment may delete unnecessary information stored in the storage area (403) based on the identification information unique to the logical printer and the name information of the logical printer. In this way, an increase in unnecessary information resulting from the deletion of a logical printer or a change in the name of a logical printer may be prevented, for example.

As described above, the print control program (402) according to the present embodiment may readily use setting information management functions provided by the OS (401) while preventing an increase in unnecessary information resulting from the deletion of a logical printer and/or a change in the name of a logical printer, for example.

Note that reference numerals indicated above in parentheses are provided for illustrative purposes only and are not intended to limit the scope of the present invention.

Although the present invention has been described above with reference to certain illustrative embodiments, the present invention is not limited to these embodiments, and numerous variations and modifications may be made without departing from the scope of the present invention.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any non-transitory storage medium for storing processor readable code such as a floppy disk, a hard disk, a CD ROM, a magnetic tape device or a solid state memory device. The non-transitory storage medium can comprise any computer-readable medium except for a transitory, propagating signal.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

The present application is based on and claims the benefit of priority of Japanese Patent Application No. 2014-209827 filed on Oct. 14, 2014 and Japanese Patent Application No. 2015-142605 filed on Jul. 17, 2015, the entire contents of which are hereby incorporated by reference.

What is claimed is:

1. An information processing apparatus, comprising:
   a memory; and
   a processor configured to implement processes of:
   generating identification information unique to a logical printer;
   assigning the unique identification information to the logical printer;
   associating the assigned identification information with setting information and name information of the logical printer;
   storing the associated identification information, setting information, and name information of the logical printer in a first storage area that is managed with respect to a user by an operating system;
   comparing the assigned identification information and the associated name information of the logical printer that is stored in the first storage area with assigned identification information and name information stored in a second storage area; and
   deleting the setting information of the logical printer associated with the assigned identification information and name information of the logical printer that is stored in the first storage area when it is determined that either the assigned identification information or the name information of the logical printer associated with setting information that is stored in the first storage area does not match the assigned identification information or name information stored in the second storage area.

2. The information processing apparatus as claimed in claim 1, wherein
   the setting information of the logical printer associated with the assigned identification information and the name information of the logical printer that is stored in the first storage area is deleted when it is determined that the name information of the logical printer stored in the first area does not match the name information stored in the second storage area.

3. The information processing apparatus as claimed in claim 1, wherein
   the setting information of the logical printer associated with the assigned identification information and the name information of the logical printer that is stored in the first storage area is deleted when it is determined that the assigned identification information of the logical printer stored in the first area does not match the assigned identification information stored in the second area.

4. The information processing apparatus as claimed in claim 1, wherein
   the setting information of the logical printer is stored in the first storage area in association with the assigned identification information unique to of the logical printer, and the assigned identification information of the logical printer is stored in the first storage area in association with the name information of the logical printer.

5. The information processing apparatus as claimed in claim 4, wherein the processor is configured to further implement a process of:
   acquiring the setting information of the logical printer that is stored in association with the assigned identification information of the logical printer from the first storage area.

6. The information processing apparatus as claimed in claim 1, wherein
   the first storage area includes a registry area for storing setting information of a user that is currently logged into the operating system.

7. The information processing apparatus as claimed in claim 1, wherein
   the first storage area includes a file for storing setting information of each user that is provided by the operating system.

8. The information processing apparatus as claimed in claim 1, wherein
   system setting information, managed by the operating system is used in a case where the system setting information is determined to be newer than the setting information of the logical printer stored in the first storage area based on date/time information of the setting information managed by the operating system and date/time information of the setting information of the logical printer that is stored in the first storage area.

9. The information processing apparatus as claimed in claim 1, wherein
   a storage method used to store the setting information of the logical printer can be switched to another storage method.

10. The information processing apparatus as claimed in claim 1, wherein the processor is configure to further implement a process of:
    storing setting information of a previously-created logical printer as setting information of a newly-created logical printer in the first storage area in a case where name information of the newly-created logical printer is the same as name information of the previously-created logical printer.

11. The information processing apparatus as claimed in claim 1, wherein the processor is configured to further implement a process of:
    updating the setting information of the logical printer associated with the name information of the logical printer and the assigned identification information of the logical printer when it is determined that assigned identification information stored in the first storage area matches the assigned identification information stored in the second storage area.

12. A non-transitory computer readable storage medium storing a print control program that, when executed by a computer, causes a processor of the computer to implement functions of:
    generating identification information unique to a logical printer;
    assigning the unique identification information to the logical printer;
    associating the assigned identification information with setting information and name information of the logical printer;
    storing the associated identification information, setting information, and name information of the logical printer in a first storage area that is managed with respect to a user by an operating system;
    comparing the assigned identification information and the associated name information of the logical printer that is stored in the first storage area with assigned identification information and name information stored in a second storage area; and
    deleting the setting information of the logical printer associated with the assigned identification information and name information of the logical printer that is stored in the first storage area when it is determined that either the assigned identification information or the name information of the logical printer associated with setting information that is stored in the first storage area does not match the assigned identification information or name information stored in the second storage area.

13. The non-transitory computer readable storage medium storing a print control program as claimed in claim 12, wherein execution of the program further causes the processor of the computer to implement a function of:
    updating the setting information of the logical printer associated with the name information of the logical printer and the assigned identification information of the logical printer when it is determined that assigned identification information stored in the first storage area matches the assigned identification information stored in the second storage area.

* * * * *